(12) United States Patent
Ghoshal et al.

(10) Patent No.: US 10,007,936 B1
(45) Date of Patent: Jun. 26, 2018

(54) PRODUCT REVIEW PLATFORM BASED ON SOCIAL CONNECTIONS

(71) Applicant: Valutrend Corp., Danville, CA (US)

(72) Inventors: Subha Ghoshal, Danville, CA (US); Shree S. Ghoshal, Danville, CA (US)

(73) Assignee: Valutrend Corporation, Danville, CA (US)

( * ) Notice: Subject to any disclaimer, the term of this patent is extended or adjusted under 35 U.S.C. 154(b) by 0 days. days.

(21) Appl. No.: 15/391,724

(22) Filed: Dec. 27, 2016

(51) Int. Cl.
*G06Q 30/02* (2012.01)
*G06Q 50/00* (2012.01)
*G06F 17/30* (2006.01)

(52) U.S. Cl.
CPC ......... *G06Q 30/0282* (2013.01); *G06Q 50/01* (2013.01)

(58) Field of Classification Search
CPC combination set(s) only.
See application file for complete search history.

(56) References Cited

U.S. PATENT DOCUMENTS

| 7,409,362 | B2 | 8/2008 | Calabria | |
|---|---|---|---|---|
| 2006/0143067 | A1* | 6/2006 | Calabria | G06Q 10/10 705/26.1 |
| 2006/0184617 | A1* | 8/2006 | Nicholas | G06Q 30/02 709/203 |
| 2009/0070228 | A1 | 3/2009 | Ronen | |
| 2009/0282002 | A1 | 11/2009 | Reeder et al. | |
| 2011/0153451 | A1 | 6/2011 | Bitz et al. | |
| 2012/0059848 | A1 | 3/2012 | Krishnamoorthy | |
| 2014/0279202 | A1* | 9/2014 | Egozi | G06Q 10/10 705/26.7 |
| 2015/0356093 | A1* | 12/2015 | Abbas | G06F 17/30058 707/748 |
| 2016/0041973 | A1* | 2/2016 | Beckley | G06F 3/0482 707/608 |
| 2016/0171588 | A1* | 6/2016 | Linden | G06Q 30/0631 705/26.7 |

* cited by examiner

*Primary Examiner* — Mark A Fleischer
(74) *Attorney, Agent, or Firm* — Hickman Palermo Becker Bingham LLP

(57) ABSTRACT

Methods and systems are provided for managing product reviews for users based on their social data, wherein the social data may comprise data associated with or inferred from the users' social connections.

20 Claims, 15 Drawing Sheets

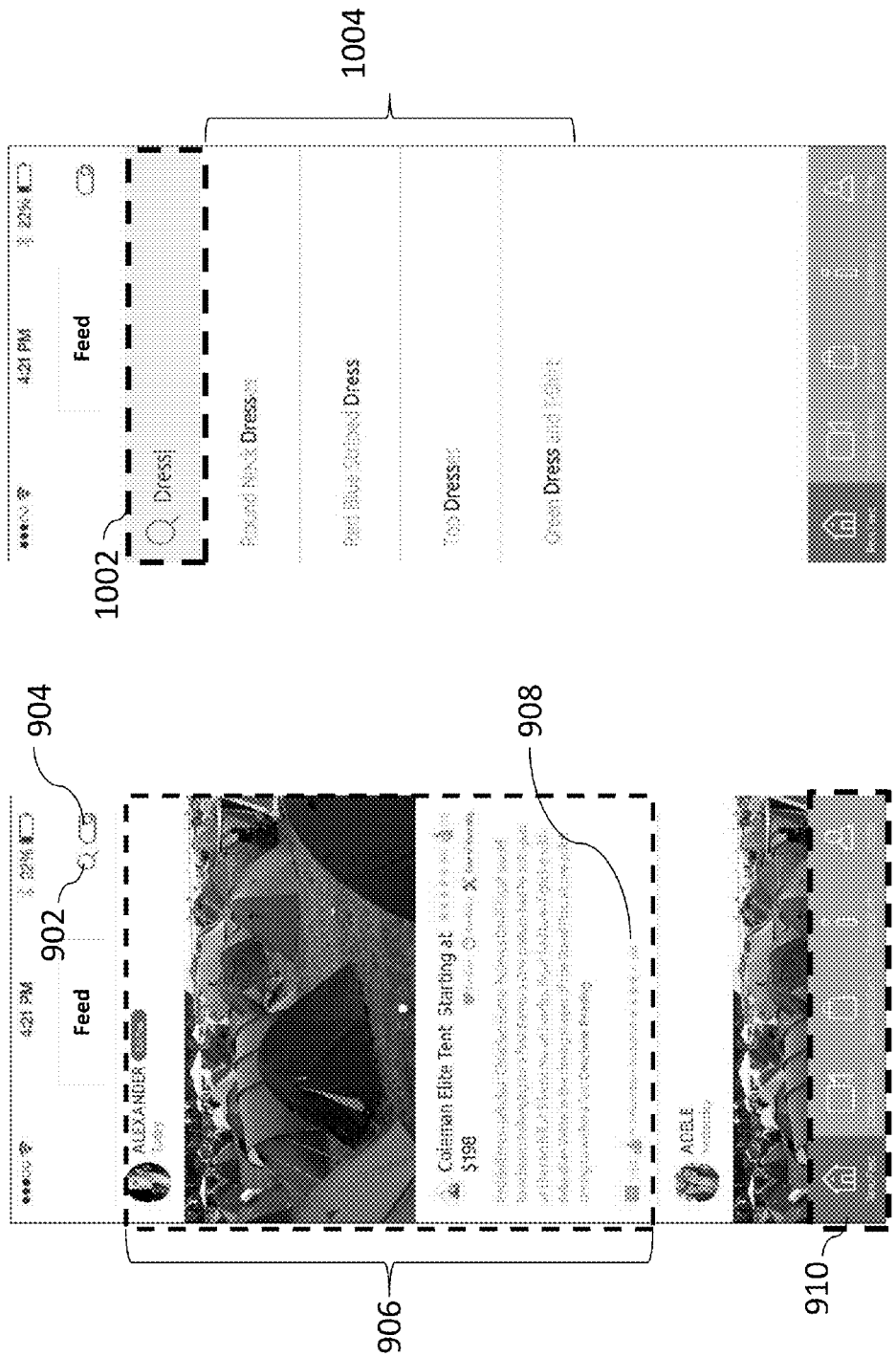

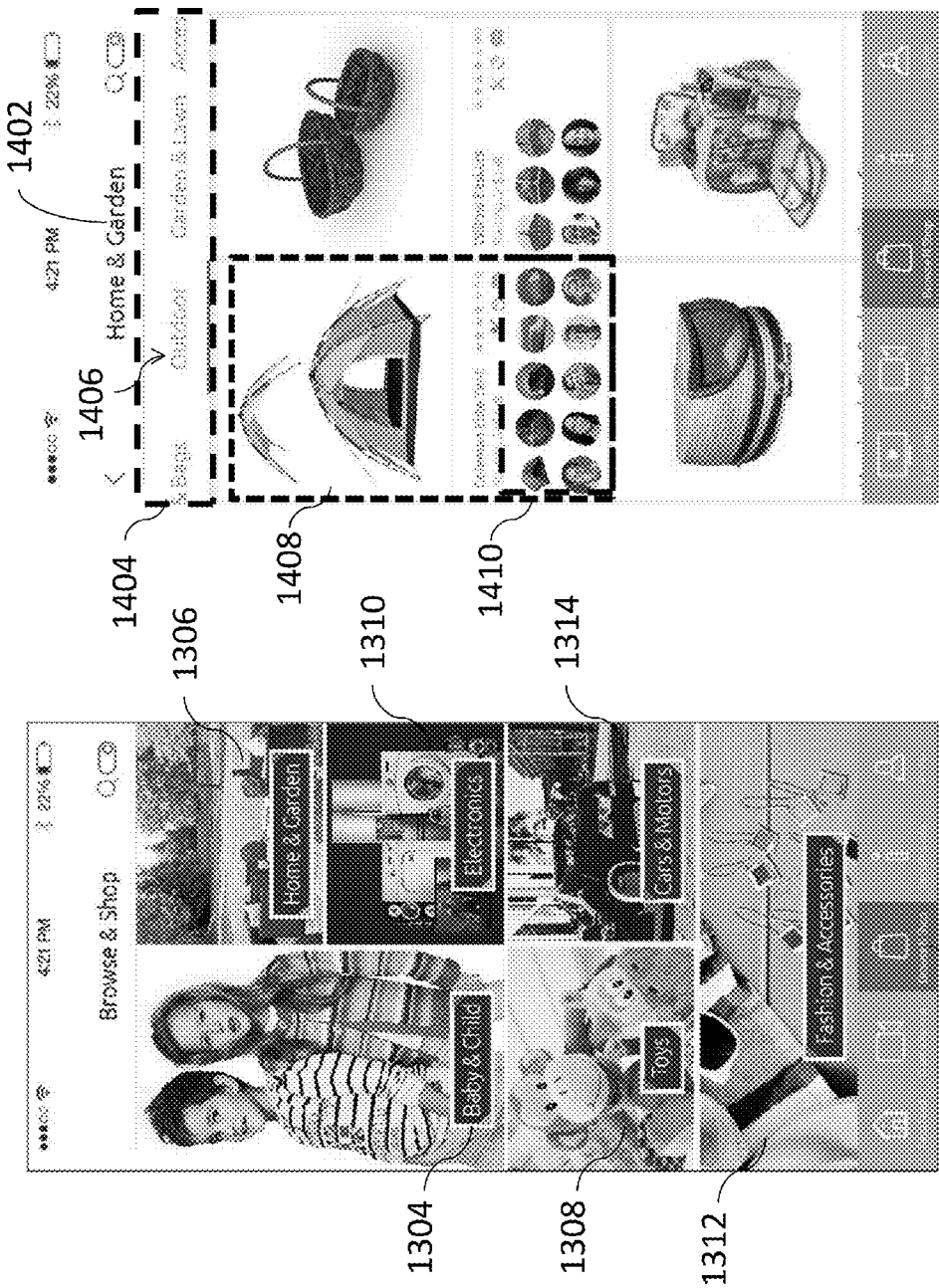

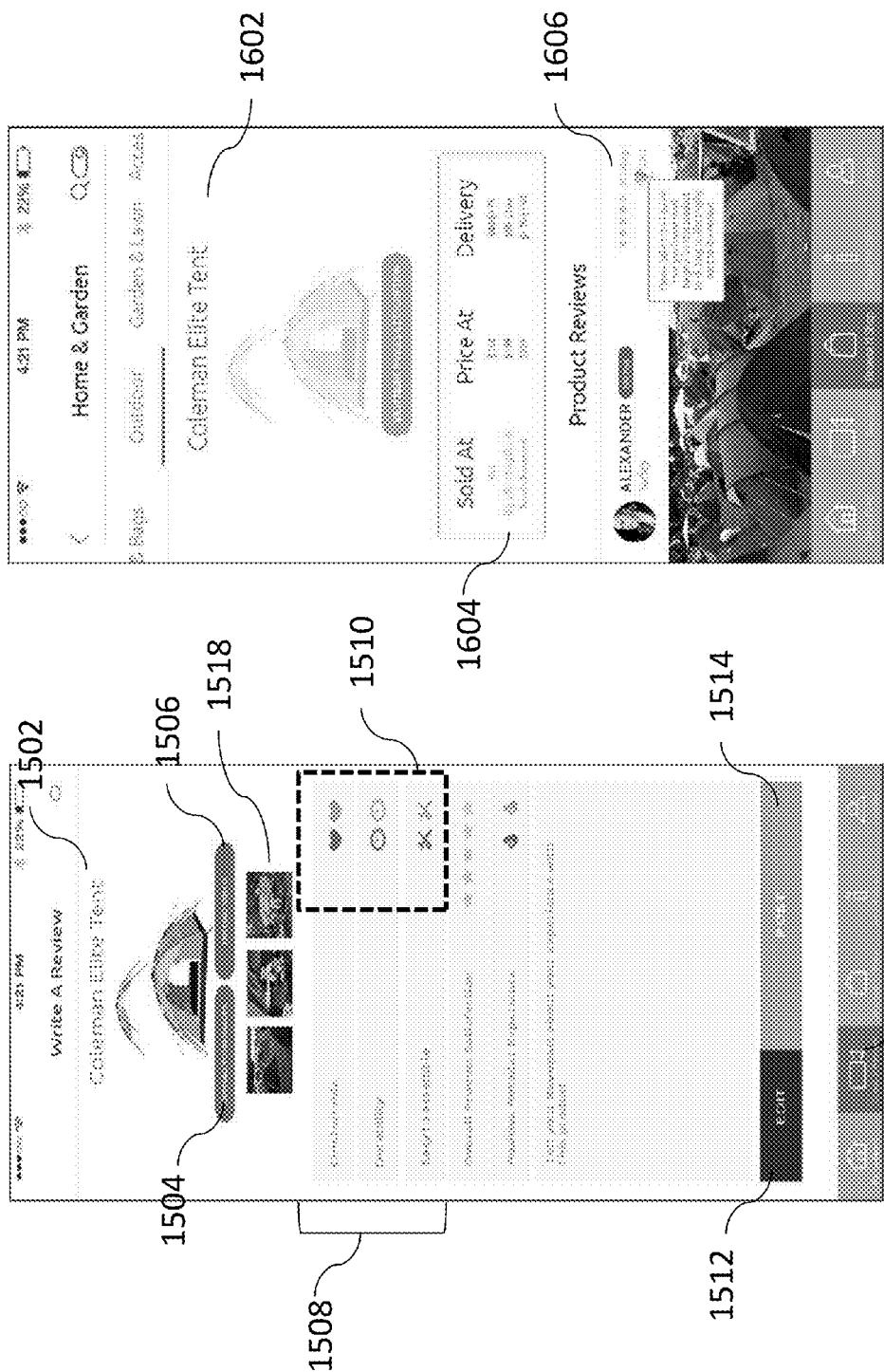

PRODUCT REVIEW PLATFORM BASED ON SOCIAL CONNECTIONS

BACKGROUND

Traditional product review systems on e-commerce websites allow users to view product reviews prior to making a purchase. Users may be able to post their own reviews and view others' reviews and ratings regarding a product of interest. Users can also search or filter through the reviews to identify a review that may be more relevant to them than others. For example, the user may filter based on demographic or geographic information. In general, the more knowledgeable a reviewer is about a product and a user, the more helpful the reviewer's review on the product is likely to be to the user.

SUMMARY

The application discloses a system and related methods that provide a product review system based on social connections. The system is capable of generating and serving customized product information and product reviews to users based on the user's social connections and data obtained from the connections. Such customization may provide highly relevant and reliable product reviews to the user from trustworthy reviewers, compared to reviews authored by anonymous reviewers or by those not socially connected to the user.

The system and related methods disclosed herein may provide users with various benefits. First, the user may receive higher quality reviews from reviewers whom the user can trust. For example, the system provides users with the ability to efficiently search, sort, filter reviews based on the relationship between the user and the reviewer. Additionally, by leveraging the user's social connections to solicit reviews, the user may receive faster response to review requests. For example, the system may enable a user's requests for product reviews to be sent out in real time to other users socially connected to the user based on what the user knows about the other users. Furthermore, the system and related methods may enable better socialization and shopping experience compared to traditional product review systems and e-commerce platforms. Users on the system may easily form connections with one another, and the system may be configured to automatically connect users based on their interaction patterns on the system, which can further improve their shopping experience.

The system may also be highly scalable. As the number of user increases, the system may be configured to rapidly scale to manage increased traffic. For example, the system may be implemented based on microservices architecture, which may comprise a suite of independently deployable, small, modular services in which each service runs a unique process and communicates with other services. A microservice configured to manage users (e.g., user microservice) may exist separately from a microservice configured to manage products (e.g., product microservice) or a microservice configured to manage reviews (e.g., review microservice), and each may be deployed independently based on the system needs. The microservices architecture many also provide additional computational efficiency. For example, the review microservice and user microservice may respond to a user's request to search reviews by considering the similarity or the nearness of the request to prior requests based on search parameters and the user's social connections. In some embodiments, the microservices may initially serve same or similar results from an earlier, similar search query (by an individual who may or may not be identical to the user) in order to minimize computational costs, and later refine the results—based on the load to the server and bandwidth constraints—to reflect the actual social connections and affinity of the user.

The system may also offer flexibility, since the allocation of work between the server and the client (e.g., user device) may be adjusted (e.g., through software updates) based on the computational load or demand on one or more components of the system. For example, data may be processed or computation may be performed by the server, or data may be processed directly by the client. The system offers further flexibility and efficiency by automatically determining whether to perform a computation on demand or in the background. For example, in order to present customized reviews to a user, the system can score each relevant review with respect to the user in response to a user request for reviews or whenever the review becomes available, depending on user preferences, resource availability, etc. By automatically crawling for existing reviews and allowing users to create new reviews, the system offers a central repository of reviews of a large volume and variety for convenient access by the users.

In a first aspect, a method of managing reviews based on social connections is provided. The method may comprise: receiving social data regarding one or more social connections of a user with a plurality of other users, wherein the social data indicates an affinity and a subject matter area associated with the one social connection with a specific user of the plurality of other users, identifying a request from the user related to a product; and preparing, by a processor, a response to the request based on the social data.

In some embodiments, the preparing may include determining, by a processor, a reviewer based on the social data from the plurality of other users for offering a review on the product.

In some embodiments, the affinity associated with the one social connection may be based on a type of relationship between the user and the specific user or a personal preference of the user; and the subject matter area associated with the one social connection may be based on a profession or hobby of the specific user. In some embodiments, the method may further comprise inferring the hobby of the specific user from reviews by the specific user.

In some embodiments, the social data may further include contact information associated with the one social connection with the specific user, and the method may further comprise: identifying contact information associated with one of the social connections with the reviewer from the social data; and sending a request for contacting the reviewer with the contact information to a device of the user. In an embodiment, the method may further comprise, upon receiving a positive response from the device of the user, establishing a connection with a device of the reviewer over a communication network based on the contact information.

In some embodiments, the method may further comprise sending a request to a device of the reviewer over a communication network for providing a review on the product for the user. In one embodiment, the method may further comprise, upon receiving a review from the device of the reviewer, incrementing an amount of reward for the reviewer.

In some embodiments, the identifying may include receiving a query from a device of the user or extracting an item from a wish list of the user in a local database.

In some embodiments, the determining may further comprise: computing a similarity between a subject matter area associated with certain social connection of the one or more social connections with a certain user of the plurality of other users and a category of the product; and selecting the certain other user when an affinity associated with the certain social connection with the certain user exceeds a first predetermined threshold and the similarity exceeds a second predetermined threshold.

In a second aspect, another method of managing reviews based on social connections is provided. The method may comprise: identifying a list of features that apply to a product or service; receiving one or more reviews for the product or service authored by at least one of the plurality of other users, wherein a specific review of the one or more reviews authored by the specific user for the product or service includes one or more values provided by the specific user for one or more of the list of features, and wherein the preparing includes adjusting for the user the one or more values provided by the specific user in the specific review based on the social data related to the specific user.

In some embodiments, the list of features may be for one of a plurality of predetermined categories for products or services, and the product may be in the one predetermined category.

In some embodiments, the preparing may further include: aggregating adjusted user-provided values in the one or more reviews for one of the list of features; and sending aggregated values for the list of features to the device of the user in response to the query.

In other embodiments, the preparing may further include sending one or more values provided by a merchant related to the product or service for the list of features that apply to the product or service.

In another embodiment, the preparing may further include: scoring each of the one or more reviews based on the adjusted user-provided values in the review; and sending a ranked list of reviews based on the scoring to the device of the user in response to the query.

In some embodiments, the scoring may further be based on a preference of the user or demographic information of the user.

In some embodiments, the scoring may include performing a fuzzy match between the query and the one review.

In some embodiments, the adjusting, scoring, or sending may be performed in response to the query in real time, according to a predetermined schedule, or when the scoring produces a new ranked list.

In other embodiments, the method may further comprise sending, for one of the ranked list of reviews, information indicating a subset of the list of features with adjusted user-supplied values in the one review that exceed a predetermined threshold.

In a third aspect, a method of managing reviews based on social connections is provided. The method may comprise: receiving social data regarding one or more social connections of a user with a plurality of other users, wherein the social data indicates an affinity and a subject matter area associated with the one social connection with a specific user of the plurality of other users; receiving by a rating given by a user for a review of a product or service authored by the specific user; computing, by a processor, a score for the review with respect to the user based on the social data and the rating; and when an aggregate score over a set of reviews authored by the specific user exceeds a predetermined threshold, establishing an automatic feed of reviews authored by the specific user to the device of the user.

In some embodiments, the method may further comprise: determining a similarity between a subject matter area associated with the one of the social connection with the specific user and a category of the product or service, wherein the computing includes calculating a higher score when the rating is higher, when an affinity associated with the one social connection with the specific user is higher, or when the similarity is higher.

In other embodiments, the method may further comprise, when the aggregate score over a second set of reviews authored by the specific user falls below a second predetermined threshold, cancelling the automatic feed of reviews authored by the specific user to the device of the user.

In a fourth aspect, a method of managing reviews based on social connections is provided. The method may comprise: identifying a list of features for a predetermined category to which a product or service belongs; receiving social data regarding one or more social connections of a user with a plurality of other users, wherein the social data indicates an affinity and a subject matter area associated with the one social connection with a specific user of the plurality of other users, receiving a video review of the product or service made by the user in the one predetermined category, wherein the video review includes one or more values provided by the user for one or more of the list of features; wherein the video review demonstrates the one or more features, and determining which of the plurality of other users can access the video review based on the social data.

In some embodiments, the video review may include timing information specifying a portion of the video review corresponding to the one feature.

In other embodiments, the method may further comprise receiving a vote for or comment on the portion of the video review from one of the plurality of other users.

In another embodiment, the method may further comprise computing a similarity between a subject matter area associated with a certain social connection of the one or more social connections with a certain user of the plurality of other users and the one predetermined category, wherein the determining includes selecting the certain user when an affinity associated with the certain social connection with the certain user exceeds a first predetermined threshold, or the similarity exceeds a second predetermined threshold.

In some embodiments, the social data may further indicate a specification of at least one of the list of features associated with the one social connection with the specific user, and further comprising computing a match score between the one or more features and the at least one feature wherein the determining further includes selecting the certain user when the match score exceeds a third predetermined threshold.

In some embodiments, the determining may further include selecting the certain user when demographic information of the certain user satisfies a predetermined condition.

In another embodiment, the method may further comprise sending a notification of the video review to a device of one of the plurality of other users who can access the video review over a communication network.

In other embodiments, the method may further comprise: comparing the user-supplied values in the video review with merchant-supplied values corresponding to the product or service for the list of features for the one predetermined category; and sending information indicating differences between the merchant-supplied values and the user-supplied values to a device of one of the plurality of the other users who can access the video review over a communication network.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 9 illustrates a UI for providing a review feed to a user;

FIG. 10 illustrates a UI for searching reviews;

FIG. 13 illustrates a UI for listing product categories;

FIG. 14 illustrates a UI for listing products under a certain category;

FIG. 15 illustrates a UI for creating product reviews;

FIG. 16 illustrates a UI for displaying product information, including a listing of available e-commerce retailers.

DETAILED DESCRIPTION

Figure 1:
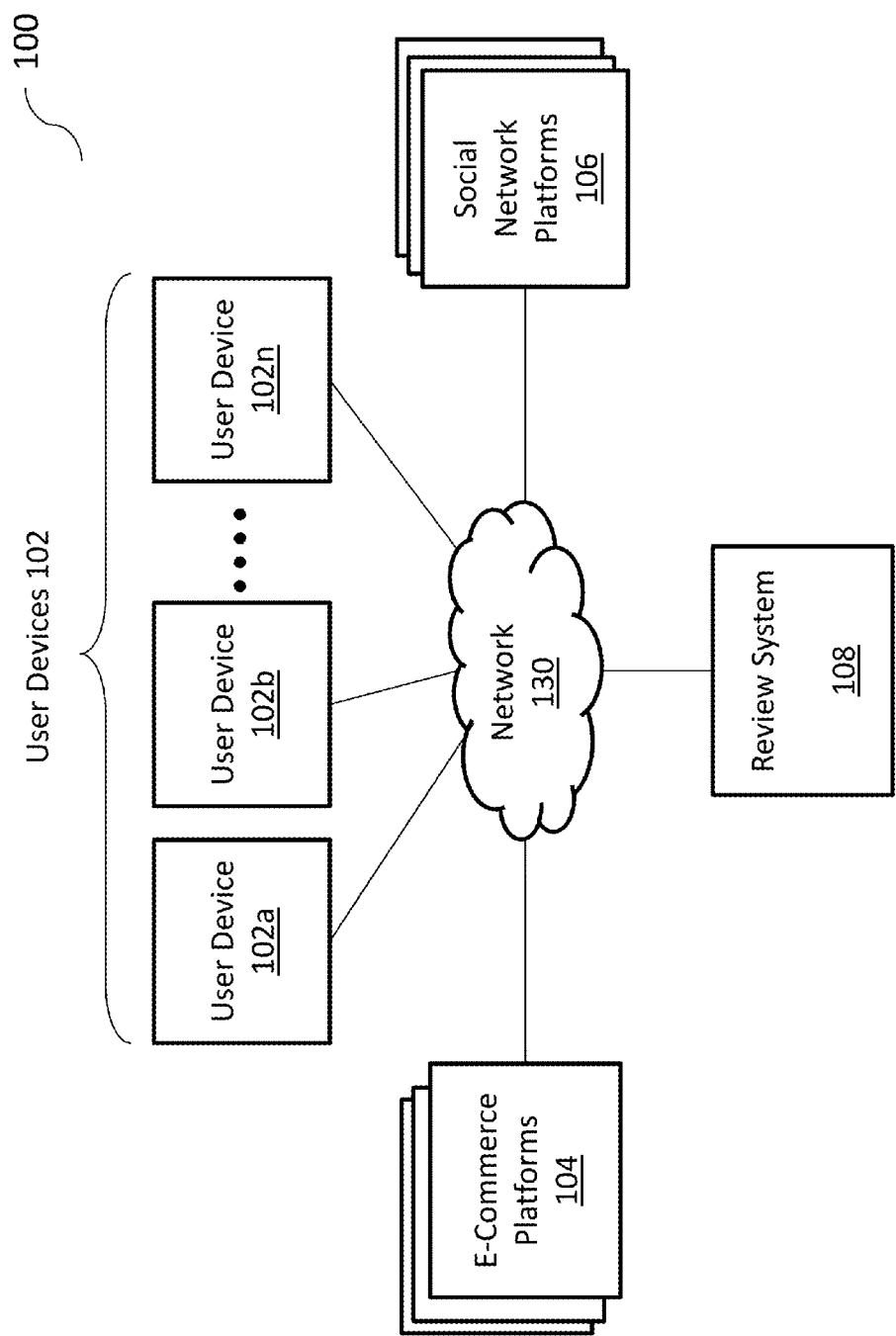
FIG. 1 illustrates an exemplary environment in which a review system based on social connections operates.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

As used herein, the term "product" or "products" may refer to anything, either tangible (e.g., goods) or intangible (e.g., services)—or a combination of both—offered for sale by an individual or an entity. "Product" or "products" can be physical, or in virtual or cyber form. Further, "product" and "products" can refer to a single product or to a grouping of products. The term "product information" may interchangeably refer to any information or data associated with a product or product category. For example, product information may include, but is not limited to, recommendations, features, ratings, reviews, comments, survey results, time and locations of availability, prices, purchase histories, or any other information/data related to a product or product category. The term "product category" may refer to any grouping, type, class, division, subdivision, set, kind, or classification of products.

As used herein, "product feature" may refer to characteristics or attributes of a product that describe its appearance, components, capabilities and the like. For example, product features may include colors, shape or form, smell, weight, ease of use, durability, comfort and the like. "Product feature set" may refer to a set of product features.

As used herein, the term "social connection" or "social connections" may refer to any relationship between two or more individuals. An individual may have one or more social connections, and the connections may be unidirectional or bi-directional. A set of social connections may form a "social network". Social connections may also be referred to as "friends", "links", "followers", depending on the characteristics of the connection. For example, if two individuals have bi-directional social connections, they may be referred to as "friends". Alternatively, if one individual has a unidirectional connection to the other individual, the individual may or may not be "following" the other individual.

As used herein, the term "social data" may generally refer to information obtained via an individual's social connections or information that may be related to or based on the individual's social connections. If one person is connected to a second person (i.e., forming a social connection), then social data may include any type of information that may be related to, inferred, or derived from the second person and/or his personal information. For example, social data may relate to the second person's personal information such as hobbies, profession, lifestyle, hometown, areas of interest, and contact information or any other data that may be inferred or calculated based on the second person's personal information. "Subject matter area" may refer to social data that indicates an individual's area of expertise, knowledge, or interest. For example, a combination of one or more social data such as hobbies, profession, and favorite music or books may indicate one or more "subject matter areas" of an individual. Each subject matter area may also include a numeric value that represents the level of expertise. The numeric value may be represented by values between, for example, 0 and 100, wherein higher values may indicate a higher level of expertise in the particular subject matter area. The level of expertise may be specified by a user or calculated based on various factors including the individual's profession, work experience, and the like. Social data may also include or indicate the nature and type of the relationship between one individual and another. Such information may also be referred to herein as "affinity". For example, the affinity data may include a numeric value, with higher numeric values representing a stronger tie or a closer relationship between the user and another user. Affinity data may also depend on the type or category of connections. Connections categorized as "friends" may have higher affinity than connections categorized as "acquaintances". An individual who a user labels as a teacher, parent, organization leader, someone having a lot of followers, etc. could be associated with a higher affinity value for the user. More broadly, such an individual could be someone liked, admired, or cared for by the user or someone inspiring or supporting the user. The system can similarly infer an affinity type or value or allow the user to specify it manually.

As used herein, the term "review" or "reviews" may generally refer to an examination, opinion, or assessment of something. A review may be written by a user or consumer for a product based on the user's experience as a consumer of the reviewed product. Reviews on products may also be referred to as "product reviews". Reviews may be provided in a form of text, images, videos, numerical ratings, symbols, figures, or other forms that may communicate the user's experience with the product, and a combination thereof. A review can comprise multiple portions corresponding to different features of a product category, and the different portions can be in the same or different formats. Reviews may be delivered in a form of "review feeds", which may refer to a continuous delivery (or updates) of reviews. Review feeds may be updated automatically or may be updated based on certain user inputs (e.g., refresh button).

FIG. 1 illustrates an exemplary environment 100 in which a review system 108 based on social connections operate. The review system 108 can interact with one or more user devices 102, e-commerce platforms 104, and social network platforms 106 through one or more communication networks 130.

The review system 108 may be configured to provide a user with product reviews and product information by utilizing the user's social data. The review system 108 may comprise one or more processors, such as a server farm, a cloud-computing platform, a parallel computer, and so on, and storage devices. The review system 108 may interact with the e-commerce platforms 104 and the social network platforms 106 via the network 130 to collect or retrieve relevant information. Relevant information may include the user's social connections, product information, and the like. The review system 108 may be in communication—via the network 130—with the user devices 102 to obtain relevant data and provide appropriate product review and/or product information.

User devices 102, such as a user device 102a, user device 102b, and user device 102n, may be any devices associated with one or more users, such as a cellular telephone, a personal digital assistant (PDAs), a tablet, a desktop or a laptop computer, a wearable device, or any other devices including computing functionality and data communication capabilities. The user devices 102 may be configured to enable the user to receive or post product reviews, and display product information. The user devices 102 may interact with the review system 108 by requesting and obtaining the aforementioned data via the network 130.

In some embodiments, users may utilize the user devices 102 to interact with the review system 108 by way of one or more software applications (i.e., client software) running on and/or accessed by the user devices 102, wherein the user devices 102 and the review system 108 may form a client-server relationship. For example, the user devices 102 may run dedicated mobile review applications associated with the review system 108 and/or utilize one or more browser applications to access product reviews (e.g., webpages) associated with the review system 108. In turn, the review system 108 may deliver information and content to the user devices 102 related to the product of interest, for example, by way of one or more review feed pages (e.g., web pages or pages/views of a mobile application).

In some embodiments, the client software (i.e., software applications installed on the user devices 102) may be available as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering. The various embodiments of client software applications may be compiled for various devices, across multiple platforms, and may be optimized for their respective native platforms.

E-commerce platforms 104 may comprise servers and database systems that enable online commercial transactions or otherwise provide product information, such as catalogues, reviews, inventory data, etc., over computer networks. Examples of products traded over e-commerce platforms may include physical goods (e.g., fabrics, machine, computers, appliances, etc.), online goods (e.g., e-books, software, streaming media, etc.), or services (e.g., printing, banking, advertising, auctions, customer services, etc.), and the like. One or more e-commerce platforms 104 may provide user interfaces and/or open application programming interfaces (APIs) via a communication module or through a variety of means. The review system 108 can communicate with the e-commerce platforms 104 to obtain product information or facilitate e-commerce transactions.

Social network platforms 106 may comprise servers and databases that allow people to build social networks or social relations with other people who share similar personal or career interests, activities, backgrounds or real-life connections, or interests in certain types of products, and so on. Social network platforms may include socializing services that are primarily for socializing with existing friends, networking services that are primarily for non-social interpersonal communication, and social navigation services which are primarily for helping users to find specific information or resources. The review system 108 may interact with various types of social network platforms 106 to obtain relevant social data or facilitate establishing social connections for users. One or more social network platforms 106 may provide user interfaces and/or open APIs via a communication module or through a variety of means.

The network 130 may be a communication pathway between the review system 108 and the user devices 102, the e-commerce platforms 104, and the social network platforms 106. The network 130 may comprise any combination of local area and/or wide area networks using both wireless and/or wired communication systems. For example, the network 130 may include the Internet, as well as mobile telephone networks. In one embodiment, the network 130 uses standard communications technologies and/or protocols. Hence, the network 130 may include links using technologies such as Ethernet, 802.11, worldwide interoperability for microwave access (WiMAX), 2G/3G/4G mobile communications protocols, asynchronous transfer mode (ATM), InfiniBand, PCI Express Advanced Switching, etc. Other networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

In some embodiments, a user of the user device 102a may be interested in a product, and the review system 108 may be configured to obtain information related to the product from the e-commerce platforms 104; the review system 108 may also obtain social data relevant to the user of the user device 102a from the social network platforms 106. The user devices 102 and the review system 108 may establish communication and interact via the client software application installed on the user devices 102. The review system 108 may be configured to process and respond to the requests received by the user devices 102. The user devices 102 may be provided with dynamically selected review content based on the user's social connections.

In some embodiments, the client software application can send HTTP requests over SSL encryption (i.e., HTTPS) to the review system 108. The request may be sent to the review system 108 in a form of a uniform resource locator (URL). Such requests may be authenticated via one or more known authentication methods such as, for example, a direct password method, OATH method, or other multi-factor authentication methods. Upon successful authentication, the subsequent HTTP request/response transactions may also be performed over SSL encryption.

Figure 2:
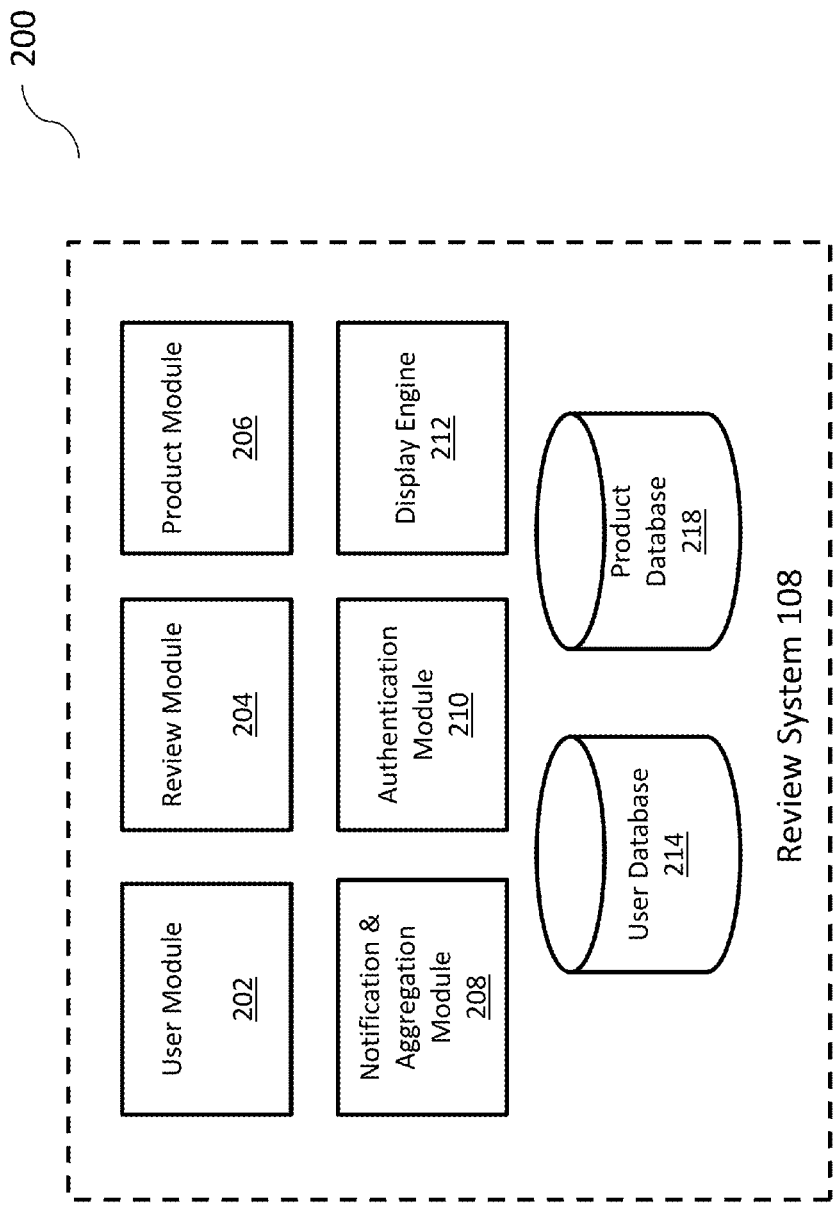
FIG. 2 illustrates exemplary components of the review system.

FIG. 2 illustrates exemplary components of the review system 108. The review system 108 can include various components for performing the processes and features described herein. For example, in the illustrated embodiment, the review system 108 include a user module 202, review module 204, product module 206, notification & aggregation module 208, authentication module 210, and display engine 212, which access a user database 214, and a product database 218, in communication with each other using any suitable communication protocols.

These components of the review system 108 are generally functional components that can generate useful data or other output using specific input(s). The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 2, the review system 108 can include more components or can combine the components into fewer components (such as a single component), as may be desirable for a particular implementation. One or more of the components can be implemented by a user device based on communication with the review system 108. The interactions among these components are illustrated in detail below.

The database associated with the review system may comprise the user database 214 and product database 218. The number of databases or types of databases may be altered and two or more types of databases may be combined to form a single type of database. The user database may be configured to store the user's profile information. The user profile information may also include any connections between two users of the review system 108, or the user and other users who may be not part of other systems. The product database 218 may be configured to store information related to a product and its associated merchant. Reviews for products may be stored in the product database 218.

Each component of the review system 108 may be implemented using one or more computing devices (e.g., server devices) including at least one processor executing instructions that cause the review system to perform the processes described herein. The various components of the review system listed above can be implemented by a single server device or across multiple server devices, as described above.

In some embodiments, review system 108 may be implemented based on microservices architecture, in which complex applications can be composed of small, independent processes communicating with each other using language-agnostic APIs. Under the microservices approach, the set of servers for the review system 108 may execute software composed of a set of standalone programs (a/k/a microservices). For example, user module 202 can be implemented as a user microservice; review module 204 can be implemented as a review microservice; product module 206 can be implemented as product microservices; and notification and aggregation module 208 can be implemented as notification and aggregation microservices. Implementing the review system 108 with microservices architecture can provide various benefits for the system, especially concerning scaling the system as the number of users joining the review system 108 grows. Microservices may be built around specific functions of the system (e.g., user microservices managing user account related functions), and each microservice may be deployed, tweaked, and then redeployed independently without compromising the integrity of the review system 108 or the other microservices of the review system 108. Therefore, each microservice of the review system 108 (e.g., user microservice, review microservice, product microservice, or others as necessary) may all be independently deployed and scaled depending on the bottleneck of the system as the user base grows.

In some embodiments, the microservices may provide an HTTP-based authenticated interface in the form of URLs and parameters where clients (either the client software described above or 3$^{rd}$ party systems) can make requests and receive responses in, for example, either a JSON or CSV format. The microservices may make HTTP requests for data read and write to an indexed document engine for textual data (e.g., using Elasticsearch) and an object store for image data (e.g., using an API to Amazon AWS). The document engine can serve to provide the database functionality and can house the review and other objects in the system. The microservices may be distributable across a variable number of servers as necessary, depending on the overall load to the system by utilizing a load balancer to distribute the load. The microservices may communicate with one another and the client application over HTTP based network protocols. The microservices may also share an authentication library to validate user access.

User Connections and User Accounts

The review system 108 may be configured to create, map, recommend, and establish connections between users in the system. In some embodiments, user devices 102 may be in communication with the review system 108 via the client application installed on one or more of the user devices 102. The viewing, creating, mapping, recommending, and various other functions related to the connections between users may be enabled via the client and server implementation described herein.

User Module

The user module 202 may be configured to manage user accounts, their associated information, and interactions between two users on the review system 108. The user module 202 may provide forms for setting up or creating individual accounts containing information about the users. User accounts may comprise a user profile, which can be used to store the description of the characteristics of a user. The user profile may include information on the user's login credentials, address, birthday, profile photo or video, hobbies, profession, favorite music, favorite products, and the like. The user profile may also include other content (or information about such content) associated with the user such as, for example, connections to other users, media (photos, videos, etc.), product reviews, groups, messages, rewards, and so forth. The review system may offer rewards to incentivize users to perform various activities, such as establishing new social connections, authoring reviews, interacting with reviews, etc.

In some embodiments, individuals may join the review system 108 by directly signing up—by creating user accounts as described above-via a client application installed on the device of a user (e.g., user device 102a). Alternatively, existing users may also invite other users in their other social networks to join the review system 108. The user module 202 and the client applications on the user devices 102 interacting with the user module 202 may be configured to send out an invitation link for other users outside to review system 108 to join the review system 108. These links may be sent out to individuals with social connections outside of the review system 108. For example, a user may have social connections on one social network platform, and may have imported the data concerning his or her connections on the one social network platform into the review system 108. The user's social connections may be stored in, for example, the user database 214. Once the invitees accept the invitation to join—e.g., by clicking on the link to sign up—they may join the review system 108; the user and the newly joined invitee may be socially connected, or may establish a certain type of relationship (e.g., become a "friend" or a "pal")—on the review system 108.

The user module 202 may also be configured to manage one or more services or requests regarding the user and his or her social connections. The user module 202 may also retrieve the user's existing social connections, manage the creation of new connections and the removal of one or more existing connections, and automatically, semi-automatically, or manually create connections based on behavior as it relates to the review system 108.

The user module 202 may also be configured to track and store data related to how the user interacts with the review system 108. For example, the user module 202 may track the user's historical usage data, purchasing history, the user's interaction pattern with the review system, and the like. Historical usage data may refer to the frequency of logins, time spent on the review system 108, frequency of visits to the review system 108, and the like. Purchasing history may include the list of products purchased by the user in the past, along with the reviews (and reviewers) referred to by the user before making the purchase. For example, the purchasing history may include the number of times the user has purchased a product after reviewing a certain reviewer's review. The user's interaction pattern with the review system 108 may include how many times the user has clicked on a certain review or reviewer, the number of comments made, or the number of votes or likes on another user's reviews, and the like.

The user module 202 may also be configured to manage social data. The user module 202 may track, learn, and update the user's social data, either manually or automatically, based on the user's personal information and the user's interaction with the review system 108. For example, a user's social data may include data on the user's domain expertise (e.g., subject matter area and the expertise level) and the nature of relationship between the user's and the user's other connections (e.g., affinity). Subject matter area may be continuously updated, for example, based on the user's purchase patterns, product reviews, social communications, etc. For example, as the user makes more purchases, writes, follows, or comments on more reviews, or have more chats with other users in a subject matter area, the system may strengthen the user's association with that subject matter area for at least some other users who are socially connected to the user based on the preferences of those other users.

Figures 7, 8:
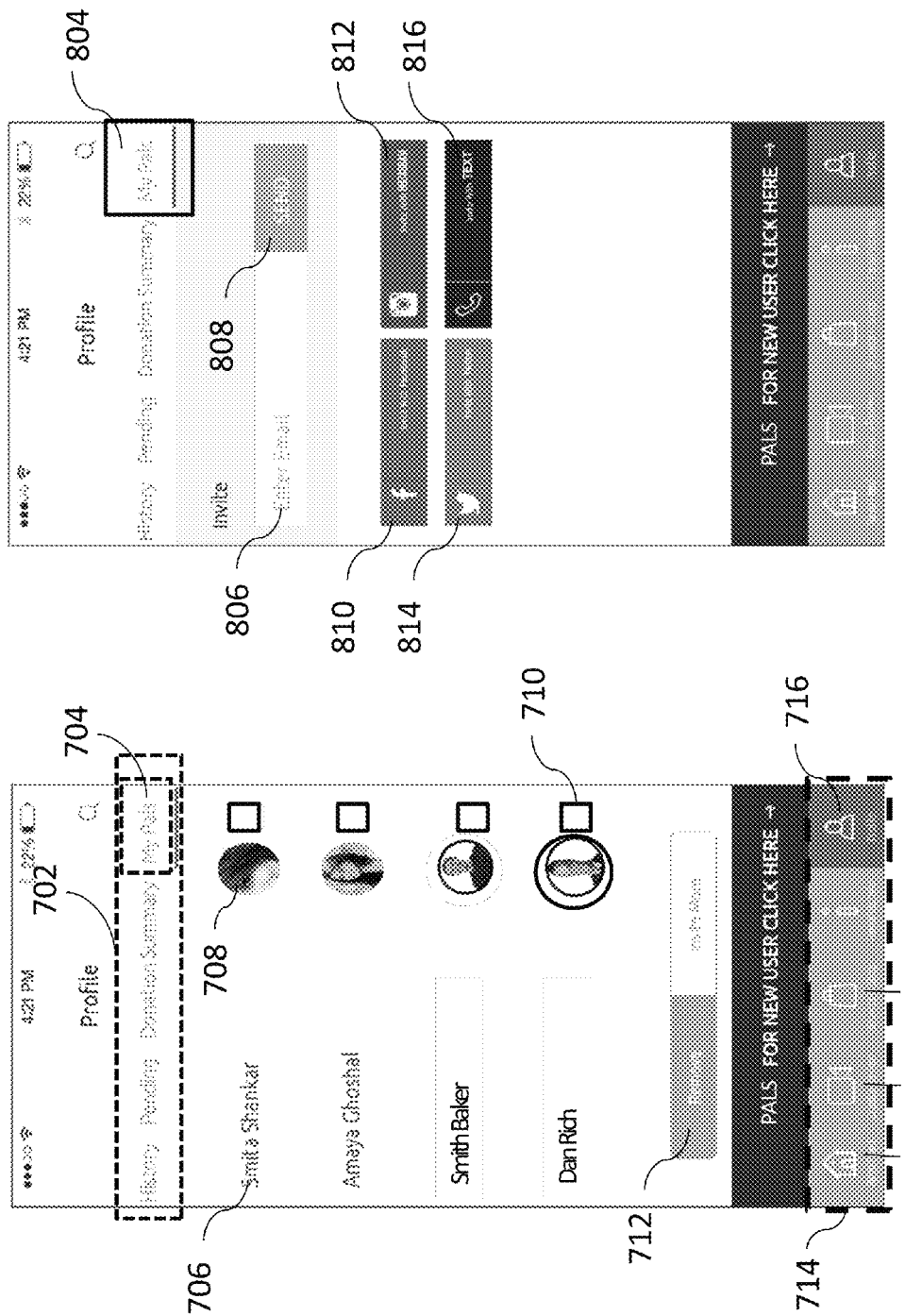
FIG. 7 illustrates a user interface (UI) for viewing and managing users of the review system.
FIG. 8 illustrates a UI for inviting others in other social circles or those not on the system to become a user of the review system.

The user module 202 may have access to the user database 214. In some embodiments, the user devices 102 may be in communication with the user module 202 to enable the functionalities listed above. For example, a user device (e.g., user device 102a), via the client application, may send requests to the user module 202 for a list of friends of the logged-in user, wherein the logged-in user is associated with the user device 102a. "Friend", for the purposes of this example, may refer to the connections between any two uses of the review system 108 or may refer to a customized group of people of interest to the user. For example, the user may be able to create various groups depending on the nature of the relationship. The user module 202 may respond to the request by transmitting to the user device the list of friends, which may be displayed on the user device (e.g., on its display screen), as shown in FIG. 7. In some embodiments, the current set of connections relevant to the user may be stored in the user database 214.

The review system 108 may also enable accounts of external e-commerce systems or platforms (e.g., e-commerce platforms 104) to be connected to the review system 108. For example, the user module 202 of the review system may provide an API. In some embodiments, the user module 202 may be configured to provide an HTTP based request and response API. Such API may define the URLs and/or parameters—for the retrieval, creation, and updating of accounts that are desired to be connected to the review system. Parameters (and/or URLs) may include one or more of the following: i) user ID, which can be an identifier that uniquely identifies the user in the retailer e-commerce system (e.g., e-commerce platform 104); ii) external site name (e.g., the name of the retailer e-commerce site); iii) external site URL (e.g., the URL for the retailer e-commerce site). It is to be appreciated by someone of ordinary skill in the art that additional parameters can be defined by the API.

Product Module

The product module 206 may be configured to respond to requests by the user devices 102 for product information. The product module 206 may serve the user devices 102 with the list of products and product information, including product categories and features. In some embodiments, the client application installed on the user device 102a may be configured to display one or more categories a user may be interested in, and also provide various product features for evaluating the product.

The product module 206 may be also configured to create, manipulate, and integrate product information. In some embodiments, the product module 206 may be configured to support third-party integrations. For example, integration of product information, including product reviews from third-party system may be supported. Product information may be stored in the product database 218.

The product module 206 may be configured to provide an interface for the creation, viewing, and updating of product category hierarchies. In some embodiments, the product module 206 may provide an HTTP-based request-and-response application programming interface (API). The request may be an authenticated HTTP-based request. The APIs can define URLs and/or parameters—for the retrieval, creation, and updating of product category hierarchies—that can enable client connections (e.g., connections between user devices 102 and the review system 108) for data exchange. Parameters may include one or more of the following fields: i) category path, which can be represented by a string representing the unique path defining the set of parents of the current category in the hierarchy as well as the name of the current category; product allowed, which can be a variable (e.g., Boolean) defining whether the particular category allows products to be defined within it or not; ii) keywords, which may be a string representing searchable words related to the category; iii) description, which may be a string describing the category; iv) ratable attributes, which can be an array of rate-able attributes for any products defined for the category or one or more of the subordinate categories (i.e., sub-categories). The array may contain a name and description of the ratable attribute, and can be used to enable users to rate specific attributes or qualities of the category of product. It is to be appreciated by someone of ordinary skill in the art that the product hierarchy can be strictly hierarchical or can contain overlapping categories and additional parameters can be defined by the API.

The product module 206 may also be configured to provide the creation, viewing, and updating of retailer e-commerce product inventory. In some embodiments, the product module 206 may be configured to provide an HTTP-based request and response API for the above functionality. The request may be an authenticated HTTP-based request. The HTTP-based API can define URLs and/or parameters—for the retrieval, creation, and updating of the above metadata—enabling client connections (e.g., connections between the user devices 102 and the review system 108) for data exchange. Parameters (and/or URLs) for the API enabling such connections may include one or more of the following: i) barcodes (e.g., retailer identifier field); ii) SKU (e.g., retailer identifier field); iii) brand (e.g., brand of the product); iv) model (e.g., model name or number for the product); v) keywords (e.g., identifying words for the product that are searchable; vi) description (e.g., detailed description of the product); vii) quantity available, which may be defined by an array containing variables such as location type (e.g., location_type), location geocode (e.g., location_geocode), and quantity; viii) price (e.g., base price that the e-commerce websites charge for a product); ix) currency (e.g., currency that the price is quoted in); x) minimum cost to ship; xi) maximum cost to ship; xii) countries available to ship to; xiii) any notes regarding the shipping; xiii) purchase URL (URL to click through to purchase); xiv) product categories, which may be defined by an array of string paths referencing one or more of the "category path" field from the category hierarchy field defined above; xv) images, which may be defined by an array of URLs referencing images of the product. It is to be appreciated by someone of ordinary skill in the art that additional parameters can be defined by the API.

The product module 206 may be configured to enable purchase of a product via the communication network 130. For example, the user may browse products on the review system 108 and the user may desire to purchase a certain product. In one embodiment, the review system 108 may provide a redirect to an e-commerce platform 104, and the user may then purchase the product from the e-commerce platform 104. Alternatively, the product module 206 may be configured to provide product purchases directly on the review system 108. For example, the product module 206 may provide various online payment technologies (e.g., payment via credit card).

Review Module

The review module 204 may be configured to manage the creation, editing, updating of reviews and the generation of customized review feeds for a user. For example, the review module 204 may generate and serve review feeds to the device of a user (e.g., user device 102a) based on one or more variables that may or may not be customizable by the user. The variables may include: i) option to view review feeds filtered based at least in part on one's social connections; ii) product category; iii) price range; iv) range of values for overall product rating; v) range of values for particular product category rating; vi) range of values for specific product features, vii) retailer or brand, and the like. Other variables may be included based on the data available by the review system 108, including any product information or social data.

The review feeds may also be customized, individualized, searched, and filtered based on the user's profile information (e.g., user preference), social connections, social data, and the like. The user-specific data, such as the ones listed above, may be tracked by the user module 202, as described herein. The review module 204 may be continually monitoring such data (e.g., via communicating with the user module 202) to further customize the review feeds that are served to the device of the user (e.g., user device 102a).

In some embodiments, the client application installed on a device (e.g., user device 102a) may be configured to send requests (e.g., HTTP requests) to the review module 204 to retrieve a review feed. The request may include one or more of the optional parameters, including the variables listed above, which may determine which reviews are shown on the user's review feed. In some embodiments, the requests may be sent in an HTTP POST format based on user selections.

The review module 204 may also be configured to provide users with methods to create various types of reviews, including video reviews. In some embodiments, the client applications are installed on the user devices 102, and may be configured to request forms to be used for creating reviews. Creating a product review may include the user inputting one or more data fields or selecting one or more options. The product review may include information such as: i) author; ii) review text as written by the author (e.g., document style formatted descriptive write up); iii) author's overall ratings for the product; iv) ratings for features of the product's category; v) overall ratings; vi) product name, including the brand and model; vii) retailer where the product was purchased; viii) image and video URLs. It is to be appreciated by someone of ordinary skill in the art that additional types of information can be included in a product review.

The review module 204 may also be configured to provide methods for creating video reviews. The video reviews may be created and shared with one or more other users on the review system 108. The user may desire to create video reviews for a particular group of people. For example, the user may desire to create and share a video review with the user's social connections (which may also be referred to herein as the user's "social circle" herein). Alternatively, the review module 204 may be configured to automatically share the video review with other users who may be interested in the review, as determined by the other users' social data and social connections. For example, the video reviews may be shared with others who may be "followers" of the reviewer. The video review may cover a plurality of features of a product. For example, if the product includes four separate features that may be rated, the video review may comprise a plurality of segments, each segment covering different features of the product. If a video review of a tent is created, for example, one segment of the video review may be on the "ease of use" of a tent, and another segment of the video review may be on the "durability" of the tent.

In some embodiments, the review module 204 may be configured to provide forms that facilitate the creation of video reviews. The video review forms may include video editing functionalities that enable users to segment the video into a plurality of segments. Each segment of the video may correspond to one or more features of a product to be reviewed. Video segments may be combined, deleted, divided. Video review forms may also include features for quantitative (e.g., text) and qualitative reviews (e.g., numeric rating), which may be provided for each video segments.

The review module 204 may also be configured to solicit or prompt users to provide reviews, based on the user's purchase patterns, review patterns, social connections, etc. For example, if the user purchased a product in a category where other users have requested the user to provide a review, the review module 204 may be configured to send product review requests to the device of the user.

The review module 204 may be configured to respond to the various queries and/or requests from the user devices 102 and generate a set of product reviews, ratings, messages, and comments. In some embodiments, the client applications are installed on the user devices 102, and may be configured to receive one or more data fields of a review from a local database or from the review system 108. The review module 204 may be configured to return the same types of data as would be included in a review feed or specifically return one or more of the following data fields to the client application: i) author (of the review, who also can be referred to as the "reviewer"); ii) content of the review (e.g., review text) as written by the author, which may or may not be a document style formatted descriptive write-up; iii) author's overall ratings of products (e.g., number of stars) as well as ratings and/or comments for specific attributes of the product's various features (symbols/figures/icons may be displayed on the UI of the client application based on the attributes); iv) other's rating of the author; v) comments related to the product review from other users in the review system and follow-up comments in response by the author; vi) product name, including brand and model; vii) retailer where the product was purchased; viii) image and video URL or links (which may be used, for example, in separate URL-based HTTP requests to retrieve binary data), ix) average product ratings based on the set of users provided, or all reviewers if no users are specified in the request; x) timestamp of when the request was processed; and xi) a request for review (e.g., a text message requesting a review for a product by an author based on social connections). It is to be appreciated by someone of ordinary skill in the art that additional data fields can be returned. The review module 204 may be configured to adjust one or more of the data fields based on the user's social connections, before returning the data fields to the client application. Specifically, the client application installed on the user device 102a may be configured to adjust the one or more received data fields based on the user's social connections.

In some embodiments, once the client application installed on the user device 102a receives one or more data fields listed above from the review module 204, the client application may be configured to request image and/or video data associated with one or more reviews. The product module 206 may be configured to handle such requests and may be configured to handle data streaming resolutions optimized or appropriate for the user device 102a.

In other embodiments, the above request may be handled by a product microservice or a separate photo & video microservice configured to handle data streaming resolutions appropriate for the use.

In some embodiments, the client application installed on the user device 102a may also register for new data update via requests to the review module 204. The client application may transmit to the review module 204 the timestamp of the last request (as received from the review system). Given the requests for new updates from the user devices 102, the review module 204 may be configured to provide updates, especially with new reviews that have been created or updated after the timestamp specified in the request. In some embodiments, the set of reviews that is sent can be based on updates made by users that were specified by the request, or all users if no users were specified.

The client application and the review system 108 may also be configured to implement paging functionality, whereby an initial set of reviews are returned. The client application can request additional pages (of reviews displayable on the GUI) as, and when the user scrolls beyond the first set of returned reviews.

The review module 204 may also be configured to provide the creation, viewing, and updating of retailer e-commerce reviews that are desired to be connected to the review system 108. In some embodiments, the product module 206 may be configured to provide an HTTP based request and response API for the above functionality. The request may be an authenticated HTTP based request. The HTTP based API can define URLs and/or parameters—for the retrieval, creation, and updating of the retailer e-commerce reviews—enabling client connections (e.g., connections between the user devices 102 and the review system 108) for data exchange. Parameters and/or URLs may include one or more of the following: i) brand (e.g., brand of the product); ii) model (e.g., model name or number for the product); iii) overall rating, which may be defined by a numeric value between 0 and 5, for example; iv) author, which may be defined by the user ID parameter defined above for the user who created the review; v) author name (e.g., name of the user that created the review, usually containing the first and last name); vi) review text, which may be a body of text describing the author's experience and rating of the product; vii) images, which may be defined by an array of image URLs for pictures and videos that the author has created as part of the review. It is to be appreciated by someone of ordinary skill in the art that additional parameters can be defined by the API.

In some embodiments, the review module 204 can be configured to allow users to interact with reviews, such as saving, forwarding, commenting on, voting for a review. For example, a user can specify when a review should be saved or to whom within the user's social circle a review should be forwarded. Based on the user's interactions with the reviews, the review system can deduce the user's preferences over reviews and reviewers and can recommend products, reviews, or connections to certain users accordingly. For example, when a user frequently reviews a particular user's reviews in a product category and consistently gives high ratings to those reviews, the system can add the particular's user's future reviews to the user's review feed or request the particular user to provide a review next time the user is interested in a product in that category. On the other hand, when a user consistently gives low ratings to those reviews, the system may reduce the affinity associated with the particular user for the user or recommend initiating a chat with that particular user to discuss the difference in opinions.

Notification and Aggregation

The notification and aggregation module 208 may be configured to provide various functionalities regarding notification and aggregation of data managed by the review system 108. In some embodiments, the notification and aggregation module 208 may be configured to aggregate data from various databases associated with the review system 108 and provide services (e.g., authenticated services) to return data aggregated by various fields including author, product category, e-commerce system, and date buckets based on social data. The notification and aggregation module 208 can be configured to create notification entries in one or more databases (e.g., the product database 218) when an aggregation result changes or when a particular event occurs, such as when a review is created, changed, or accessed by one or more users in the system, including when click throughs of a review may occur to external e-commerce systems, and/or when such activities satisfy user-specified criteria. These notifications may be saved in the database of the review system 108 including one or more of the following fields: i) review ID, which may be a unique identifier for a review in the system; ii) user that made the change; iii) a text message for the notification; iv) an array containing one or more of a) users who should be notified; and b) state of the notification (viewed, not viewed, cleared, etc.). It is to be appreciated by someone of ordinary skill in the art that additional fields can be included in the notifications. The users who can be notified by the notification and aggregation module 208 maybe configurable by the review system 108. In some embodiments, users targeted with notification may be the author of the review, participant in a review, retailers associated with the product being reviewed, and/or other users configurable by the system.

The notification and aggregation module 208 may be configured to aggregate data (or run its aggregation algorithm) based on one or more configurable criteria. The configurable criteria may include i) a user request for an updated notification or ii) a pre-scheduled hourly/daily/monthly (or at a certain pre-defined time interval) maintenance run, iii) a particular event, such as when a review is created or updated, and so on. In any of the criteria above, the review system 108 can track the most recent time that the aggregation algorithm was executed, and request new data that was created or updated after that timestamp to be added the aggregation. Specifically, review data can be aggregated in creating a customized review for a user. For example, different reviews on a product can be weighted, in its entirety or by features, based on the user's social connections with the reviewers before being aggregated into a customized review for the user. Additional data that may be aggregated for retailers may include one or more of the following: i) all product click throughs or purchases from e-commerce systems for a particular author; ii) all click throughs for a particular retailer for a particular day; iii) all click throughs for a particular product and product category for a particular day; all of the above data over a 30-day period (or any other time period configurable by the review system 108); iv) click throughs for a particular social group or the user's social connections; and the like.

The authentication module 210 may be configured to provide authentication functionalities for users and other systems or devices that may be interacting with the review system 108. E-commerce platforms 104 and social network platforms 106 may request access to data associated with the review system 108, and the authentication module 210 may grant such requests based at least on comparing credentials provided by other platforms to those stored in one or more databases associated with the review system 108.

The display engine 212 may be configured to provide appropriate GUIs or adjust settings for a variety of different user devices 102. For example, one user device 102a and another user device 102b may not share the same computing or display capabilities, and the display engine may be configured to provide optimized UI performance for each. Alternatively, the display engine 212 or partial functionality of the display engine may be programmed to be part of the client application, and certain functionalities related to display and GUI settings may be offloaded to the client application.

Figure 3:
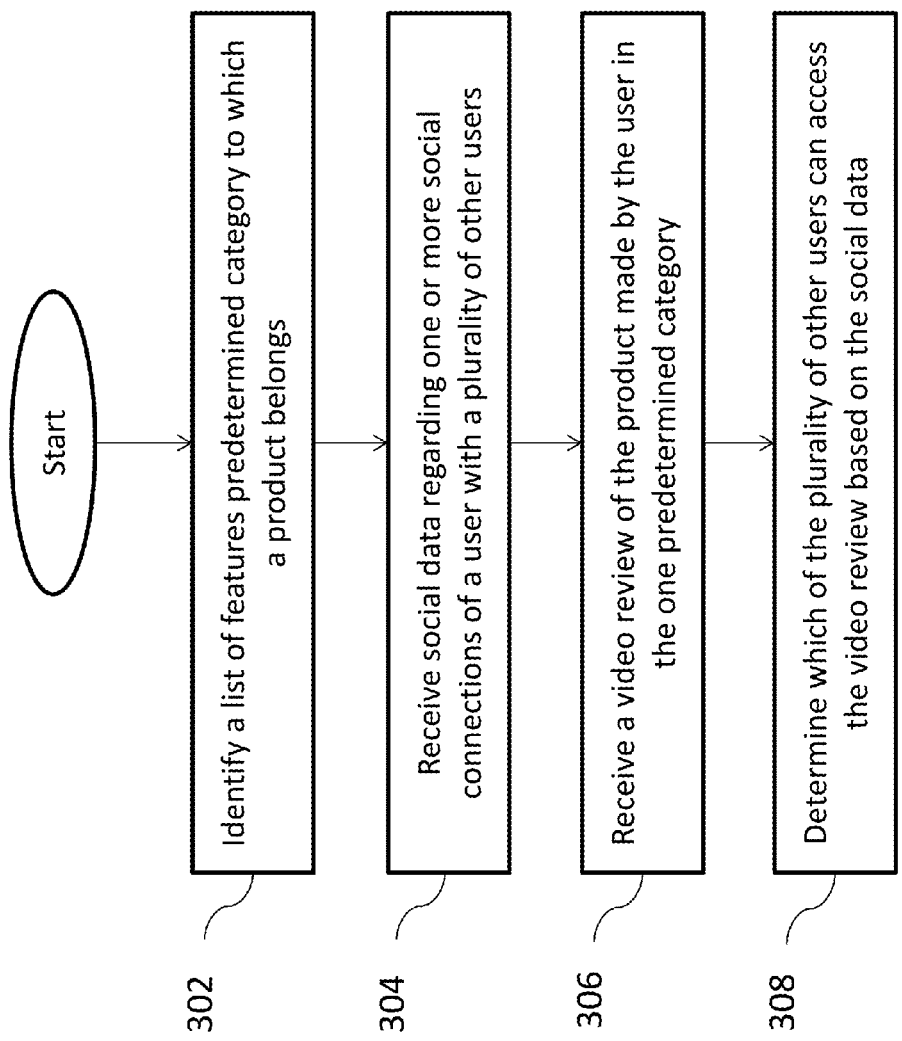
FIG. 3 illustrates a method of creating video reviews for a user's social connections on the review system.

FIG. 3 illustrates a method of creating video reviews for a user's social circle on the review system 108. As described earlier, the review system 108 may be configured to enable users to create video reviews. At step 302, the review system 108 may be configured to identify a list of features for a predetermined category to which a product belongs. In some embodiments, the product module 206 may obtain the list of features from the product database 218. For example, if the user may wish to create a video review of a certain brand of a laptop, the predetermined category for the laptop computer may be, for example, "mobile computers". One or more features may be associated with "mobile computers", including, e.g., screen resolution, display type (e.g., OLED, LED), operating system type, main processor type, storage type, and the look and feel of the laptop, etc.

At step 304, the review system 108 may be configured to receive social data regarding one or more social connections of a user with a plurality of other users. For example, the social data may indicate an affinity and a subject matter area associated with the one social connection with a specific user of the plurality of other users.

At step 306, the review system 108 may be configured to receive a video review of a product made by the user in the one predetermined category. The video review may include one or more values corresponding to the list of features that apply to products in that category. For example, the video review of the laptop computer may include values (e.g., user-provided ratings) for each feature that may be important for the specific "mobile computer" category. The values may or may not be quantitative. The video review may also be demonstrating one or more features that the user has evaluated. For example, if the user provided a value for a feature called "screen quality", one or more portions of the video review may demonstrate the "screen quality" of the laptop computer.

At step 308, the review system 108 may determine which of the plurality of other users can access the video review based at least on the social data. If the affinity of the certain social connection with the certain user exceeds a predetermined threshold, the certain user may be determined to have access to the video review. For example, the user may have maintained social connection with the other user for "x" number of days, liked/voted/commented on the other user's reviews "y" number of times, and rated the other user's reviews as "z", and have "c" number of common or mutual connections with the other user. Then, the affinity between the user and the other user may be calculated based on a combination of one or more variables listed above. The calculations of appropriate thresholds for determining whether the affinity is high enough for access may involve linear regression or one or more types of other machine learning algorithms. In this case, only the other users with numeric value of the affinity greater than a certain predetermined threshold may receive or be allowed to access the video review authored by the user.

In some embodiments, the review system 108 may also be configured to compute similarity measures between a subject matter area associated with a certain social connection of the one or more social connections with a certain user of the plurality of other users, and the one predetermined product category. For example, if the certain user's profession is plumbing, the subject matter area for the certain user may be more similar to various related tools, including tools that are required in plumbing. Therefore, the certain user's subject matter area may have a higher similarity measure with one product category (e.g., wrenches) than another (e.g., car engines). Similarity measures between the subject matter area and the predetermined product category may be calculated using predetermined semantic distance measures or pairwise similarity metrics, such as the Euclidian distance based on features of the subject matter area and features of the product category. For example, a subject matter area and a product category can share features including average object prices and applicable targets. The similarity measures can also be computed based on the same shared features using more general machine learning algorithms, which may or may not include supervised, unsupervised, and/or reinforcement learning. Other users (among the plurality of other users) whose similarity measure exceeds a certain predetermined threshold may be granted access to the video review. One or more users who may have been granted access to the video review may also collectively be referred to as the user's "social circle". The predetermined threshold may be adjusted by the user or the review system 108.

The review system 108 may also be configured to send a notification of the video review to a device of one of the plurality of other users who can access the video review over a communication network 130.

In another embodiment, the social data may further indicate at least one of the list of features associated with the one social connection with the certain user; and the review system 108 may be configured to further compute a match score between the one or more features for which the video review has values and the at least one feature associated with the one social connection with the certain user (e.g., another form of user preference or specification). For example, John might have told Mary that he cares most about the size and waterproofing capability when it comes to a hiking bag. When Mary creates or sees a review on a hiking bag that clearly demonstrates the size and waterproofing capability of the hiking bag, she would want to send or forward the review to John, maybe indicating exactly in which portions or segments of the video review John could find such demonstrations. The determining step (step 308) may further include selecting the certain user when the match score exceeds a third predetermined threshold.

In other embodiments, the determining step described above may further include selecting the certain user when demographic information of the certain user satisfies a predetermined condition. The demographic information may be available via the user's profile information, which may be stored in the user database 214. Other user profile information may also be available for the determining step.

The video review may also have additional features such as, for example, timing information, which specifies a portion of the video review corresponding to specific features. For example, if there are five features that are evaluated for the product, the video review may include five separate timestamps that correspond to the specific features. For the one or more users who may have access to the video review, the review system 108 may also be configured to receive a vote for or comment on the portion of the video review from one of the plurality of other users. Moreover, the review system 108 may be configured to enable the user or one of the other users of the review system 108 to be able to modify or delete the portion of the video review, recombine portions of the video review, or combine the portion of the video review with another portion of another video review. Furthermore, the user may switch one portion of the video with another portion of the video.

Figure 4:
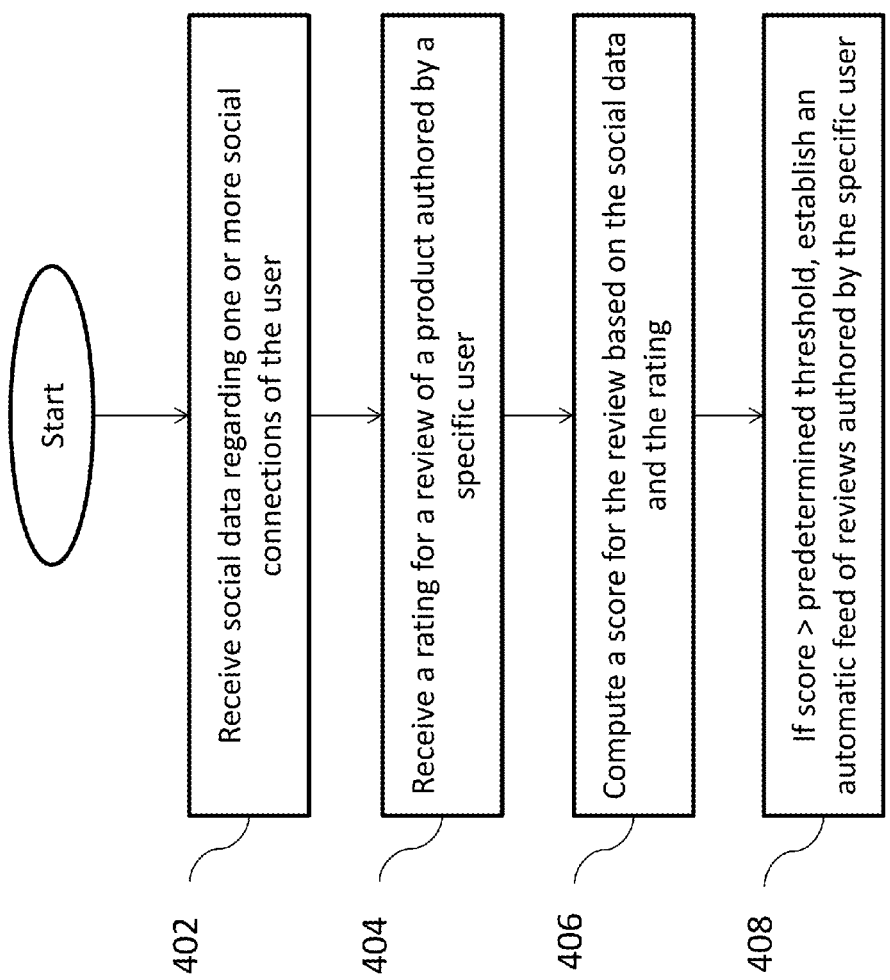
FIG. 4 illustrates a method of automatically establishing relationships with appropriate reviewers.

In some embodiments, the review system 108 may be configured to establish relationships with appropriate reviewers. FIG. 4 illustrates a method of automatically establishing relationships with appropriate reviewers. At step 402, the review system 108 may be configured to receive social data regarding one or more social connections of the user. The social data may indicate an affinity and a subject matter area associated with the one social connection with a specific user of the plurality of other users. The affinity associated with the one social connection with the specific user may be based on a type of relationship between the user and the specific user or a personal preference of the user. The subject matter area associated with the one social connection with the specific user may be based on a profession or hobby of the specific user.

At step 404, the review system 108 may be configured to receive a rating from a user device (e.g., the user device 102a) over a communication network 130 for a review of a product authored by the specific user. Similarly, the user device 102a could receive a rating from a user through a graphical user interface.

At step 406, the review system 108 may be configured to compute a score for the review specific to the user based on the social data and the rating. In some embodiments, the review system 108 may be configured to further determine a similarity between a subject matter area and a category of the product, wherein the subject matter area may be associated with the one of the social connection with the specific user. Then the computing step (step 406) may further include calculating a higher score when the rating is higher, when an affinity associated with the one social connection with the specific user is higher, or when the similarity is higher. Computation of the score based on affinity and similarity measures may involve one or more types of machine learning algorithms, including supervised and unsupervised learning, and other methods described herein. If a user is interested in purchasing an automobile, the similarity measure may be higher for someone who is a car dealer, compared to someone who is a bank teller, for example. Among those who are car dealers, the score may be higher for someone who is a closer "friend" to the user than others (e.g., an acquaintance). In other words, the score for a friend who is a car dealer may be higher than for an acquaintance who is a car dealer due to a higher affinity between the user and the friend.

At step 408, the review system 108 may be configured to compute one or more values to determine whether or not to establish an automatic feed of reviews authored by the specific user to the device of the user. For example, if an aggregate score over a set of reviews authored by the specific user exceeds a predetermined threshold, then the review system 108 may be configured to establish an automatic feed of reviews authored by the specific user to the device of the user. In some embodiments, the set of reviews may be limited to reviews for products in the same category as the product. For example, the set of reviews for the feed may be limited to "mobile phones" for users interested in making a purchasing decision on a mobile phone and have been voting for reviews on mobile phones. The set of reviews can also be limited to subject matter areas shared by the user and the specific user. In other embodiments, the set of reviews may be determined based at least in part on the time the review, the location of the product reviewed, etc. The predetermined threshold may be adjusted by the user or by the review system 108. In some embodiments, the threshold may be adjusted based on whether or not the user dislikes or votes down certain types of reviews.

In some embodiments, when the aggregate score over a second set of reviews authored by the specific user falls below a second predetermined threshold, then the review system 108 may be configured to cancel the automatic feed of reviews authored by the specific user to the device of the user.

Figure 5:
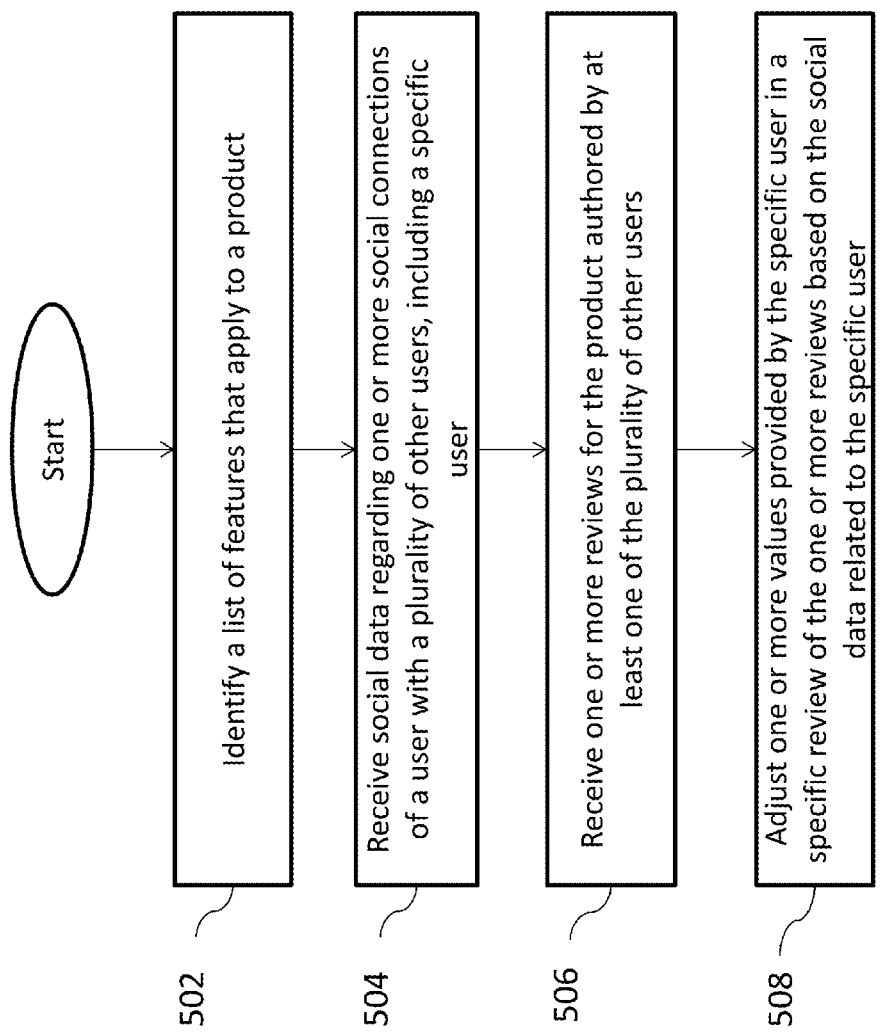
FIG. 5 illustrates a method of displaying customized reviews for a product of interest to a user based on social data.

FIG. 5 illustrates a method of displaying customized reviews for a product of interest to a user based on social data. At step 502, the review system 108 may be configured to identify a list of features that apply to a product. The list of features may be for one of a plurality of predetermined categories for products, wherein the product may be in the one predetermined category. For example, if the user is interested in purchasing a mobile phone, the features associated with the "mobile phone" category may be identified. The list of features may include "software", "weight", "ease of use", and the like.

At step 504, the review system 108 may be configured to receive social data regarding one or more social connections of a user with a plurality of other users. The social data may indicate an affinity and a subject matter area associated with the one social connection with a specific user of the plurality of other users. The user may be connected to, for example, one hundred (100) other users of the review system 108. For each of the user's connections, the social data may be obtained, based on the affinity and subject matter area associated with each of the user's social connections.

At step 506, the review system 108 may receive one or more reviews for the product authored by at least one of the plurality of other users. The specific review of the one or more reviews authored by the specific user for the product may include one or more values provided by the specific user for one or more of the list of features. In some embodiments, the specific review may include a video, image, or text demonstrating the one or more features with user-supplied values. For example, among the user's 100 connections, ten users may have each authored a review on a specific mobile phone. If the "mobile phone" category includes five features, the review system 108 may be configured to obtain all available user-supplied values for each of the features from the reviews by the ten users above.

At step 508, the review system 108 may be configured to adjust the one or more values provided by the specific user in the specific review based on the social data related to the specific user. In some embodiments, the review system 108 may receive a query related to the product from a device of the user (e.g., user device) over a communication network 130. The query may be an interactive, one-time, instant-response query or an initial request or specification to be re-run repeatedly over time. The review system 108 may then be configured to adjust the one or more values in response to the query. In other embodiments, the review system 108 may be configured to aggregate adjusted user-provided values in the one or more reviews for one of the list of features. For example, the values provided by each of the ten users can be adjusted up when the affinity associated with that user is higher or when a similarity of the subject matter area associated with that user and the product category is higher. The review system 108 may then send aggregated values for the list of features to the device of the user in response to the query. The user may receive aggregate values, such as an average or median, (or the range of values) over the aggregated data for each feature in the "mobile phone" category.

In another embodiment, the review system 108 may be configured to score each of the one or more reviews based on the adjusted user-provided values in the review, and then send—to the device of the user (e.g., a user device 102a)—a ranked list of reviews based on the scoring in response to the query. For example, the review system 108 can compute the score as a weighted average value of the adjusted values over one or more of the features for which values are available in the aggregated data based on user preferences. The scoring may further be based on a preference of the user (such as when to receive reviews and other aspects that may be unrelated to the subject matter) or demographic information of the user. Alternatively, scoring may include performing a fuzzy match between the query and the one review. The adjusting, scoring, or sending may be performed in response to the query in real time, according to a predetermined schedule, or when the scoring produces a new ranked list. For instance, the reviews may be streamed to user on their devices (e.g., user device 102a) once, periodically, or when a new review matches the user's query and gets a higher ranking, for example. In other embodiments, the review system 108 may be configured to further send, for one of the ranked list of reviews, information indicating a subset of the list of features with adjusted user-supplied values in the one review that exceed a predetermined threshold. Alternatively, the review system 108 may be configured to send, for one of the ranked list of reviews, a portion of the social data related to an author of the one review.

In some embodiments, the review system 108 may further comprise sending to the user device one or more values provided by a merchant related to the product for the list of features that apply to the product.

Figure 6:
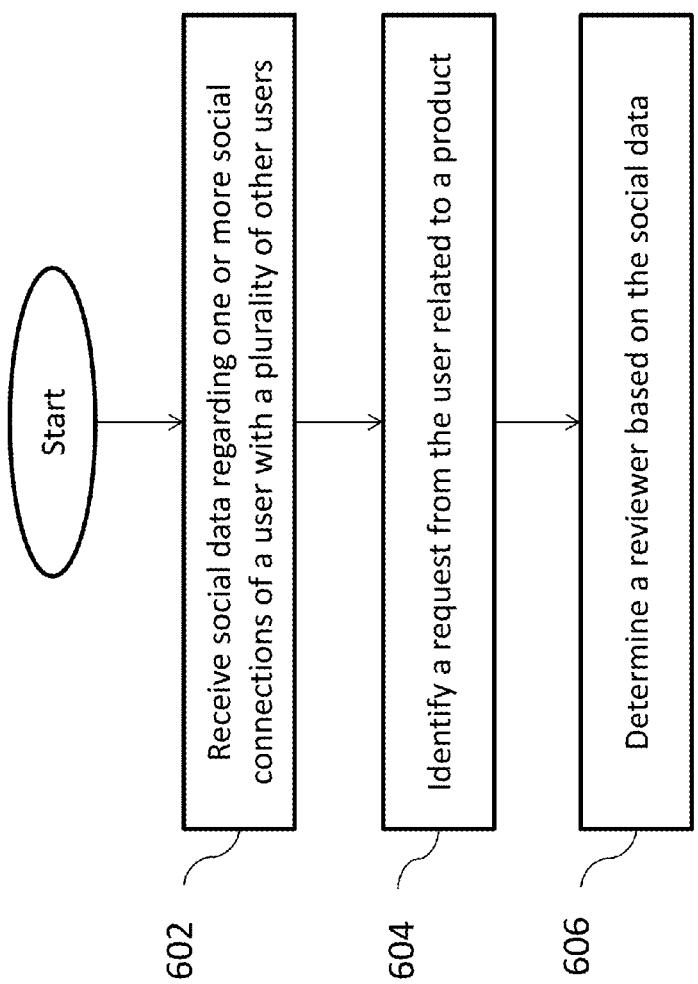
FIG. 6 illustrates a method of automatically soliciting customized reviews from appropriate reviewers.

The review system 108 may also be configured to automatically identify appropriate reviewers and provide users with reviews from those reviewers in real time. FIG. 6 illustrates a method of automatically soliciting customized reviews from appropriate reviewers. At step 602, the review system 108 may be configured to receive social data regarding one or more social connections of a user with a plurality of other users. The social connections of a user may be obtained by a request to the user module 202. In some embodiments, the social connections of a user may be stored in a user database 214. The social data may indicate an affinity and a subject matter area associated with the one social connection with a specific user of the plurality of other users. Affinity associated with the one social connection may be based on a type of relationship between the user and the specific user or a personal preference of the user. The subject matter area associated with the one social connection may be based on a profession or hobby of the specific user. The hobby of the specific user may be inferred from reviews by the specific user. Other information related to the user may be used to determine the subject matter area, including work experience, education, courses taken, and the like.

At step 604, the review system 108 may be configured to identify a request from the user related to a product. The request may be received from a user device associated with the user. For example, the client application may be installed on the user device and the user may be presented with a UI to view or browse products. The user may be able send a request for a customized review to the review system 108 by interacting with the UI. In some embodiments, the identifying may include receiving a query from a device of the user, or extracting an item from a wish list of the user. The wish list may be in a local database.

At step 606, the review system 108 may be configured to determine a reviewer based on the social data from the plurality of other users for offering a review of the product. Information regarding the determined reviewers may be presented to a user device (e.g., the user device 102a). Once one or more reviewers may be determined based on the social data, the review system 108 may be configured to send a request to a device of the one or more reviewers over a communication network for providing a review on the product for the user. In some embodiments, when the user receives a review from the device of the reviewer, the reward amount for the reviewer may be incremented.

In other embodiments, determining a reviewer based on the social data may further involve computing a similarity between a subject matter area and a category of the product. The subject matter may be associated with a certain social connection of the one or more social connections with a certain user of the plurality of other users. Once the similarity is computed, the review system 108 may be configured to select the certain user when an affinity associated with the certain social connection with the certain user exceeds a first predetermined threshold and the similarity exceeds a second predetermined threshold. Other data can be used in conjunction with social data to determine the best reviewer in response to the user's request for a review, such as the review history, the number of social connections or followers, the location, or the profession of each of the other users. For example, especially when the user desires immediate feedback, the review system would want to select a reviewer who not only has the appropriate qualifications but is most likely available—in the correct time zone, not busy at work, etc.

In some embodiments, the social data may further include contact information associated with the one social connection with the specific user. The review system 108 may be configured to identify the contact information associated with one of the social connections with the reviewer from the social data. Additional steps may be involved, which may comprise identifying contact information associated with one of the social connections with the reviewer from the social data; and sending a request for contacting the reviewer with the contact information to a device of the user over a communication network. Upon receiving a positive response from the device of the user, the review system 108 may be configured to establish a connection with a device of the receiver over a communication network based on the contact information.

Searching and Filtering

Reviews and the review feed may be searched and filtered. The review system 108 may be configured to enable searching through one or more reviews. The review system 108 may handle search queries from the user devices 102 by generating and serving the results of such search queries. The review system 108 may utilize any commonly known search algorithms. The client application installed on the user devices 102 may have a search box through which the user devices and the review system 108 may interact. The search capability of the review system may include: i) keyword-based search, which may involve words or phrases related to products; ii) location-based search, which may involve addresses or GPS locations of related reviews or products or brands; iii) connections-based search, which may involve inputting the name of another user and the review system may generate all the reviews by the other user; iv) metadata-based search, which may involve searching for product information or social data. One or more categories of the above search strings may be combined to generate a more customized search result. For example, the user may be able to type—in the search box of the client application installed on the user device (102a)—"bags with higher than 4 star ratings", the review system 108 may be configured to return all bags with ratings higher than 4 stars.

The review system 108 may also be configured to filter the review feeds and/or a list of reviews based on various filters. The user may also select a product category, range of prices, range of values for the overall product rating, range of values for a particular product category rating, or other parameters listed above to filter the reviews and review feeds. In some embodiments, the client application installed on the user device may be able to send a request to the review system 108 to filter against one or more parameters specified by the user, and the review system may return data based on the selected parameters. The reviews may also be filtered against various metadata associated with the reviews. For example, the reviews may be filtered based on the length of the review, the type of review (e.g., video, image, text, etc.), time of review, and the like. The reviews may also be filtered against product information, such as brands or retailers associated with the products. Filtering based on brands may also be referred to herein as viewing in "branded" mode. The reviews and review feeds may also be configured to be filtered based on the user's social connections. For example, the review feed may be filtered to only show reviews authored by other users who have social connections with the user. Filtering based on the user's social connections may be referred to herein as viewing in "Pals" mode. Other information available by the review system 108 and any data that may be inferred from the available information may also be used to filter the reviews and review feeds.

User Interface

FIGS. 7-20 illustrate the user interface (UI) for the review system 108. The screenshots may illustrate a graphical user interface (GUI) of a user's mobile device (e.g., user device 102*a*), which may interact with the review system 108. The illustrated GUIs include several areas within the interface, each containing one or more user interface elements. Examples of user interface elements include non-interactive elements such as text, images and video frames displayed to the user as well as interactive elements such as text, boxes, links, scrollbars, icons, and dropdown boxes. One skilled in the art will understand that this is but one example of a graphical user interface, whether server generated or generated by a rendering device (e.g., a user device 102*a*) using data retrieved from other computing devices, such as other servers described herein, to populate predetermined areas of the graphical user interface, displaying information describing a user's connections. The UI may comprise a plurality of sections (e.g., FIG. 7, 714), including the "Profile" view 716, the "Feed" view 718, the "Create a Review" view 720, and the "Browse & Shop" view 722. The Profile view 716 can be for displaying and providing user profile related information, including the user's connections within the review system 108, user's history (e.g., browsing history, comment history), pending reviews associated with the user, and the like. The Feed view 718 can be for displaying a review feed, which is generated and served to the user devices 102 as described herein. The Create a Review view 720 may provide a user with forms to help create a review. The Browse & Shop view 722 can be for displaying products, product categories, and other product information.

User Connections UI

FIG. 7 illustrates a UI for viewing and managing users of the review system 108. The UI may be displaying the profile view. The user's connections within the review system 108 can be accessed under a tab (e.g., "My Pals" tab 704 under a list of available tabs 702). In some embodiments, the user module 202 may communicate with the user database 214. Relevant data for the user's profile may be retrieved by a client application request to the user module 202. The client application may also receive the list of the current set of connections for the user via a request to the user module 202. The list may include the connection's name 706, profile photo 708, and one or more types of checkboxes 710 for each connection. While the illustrated UI in FIG. 7 shows four connections, the list of connections may be scrollable via a user input (e.g., touchscreen) and the user may scroll up or down to view more connections. The user may also drag and drop a connection on the list to reorder, based on the user's preference. The list may be sorted based on various social data. The list may be sorted based on the relative importance of the relationship. The user may click a plurality of the user's connections to form a group. The user may also click and tag his or her connections.

The user module 202 may also be configured to remove one or more currently existing connections. The client application of a user device may be communicatively coupled to the user module 202 to request removal of one or more connections. For example, the client application may have an interactive UI element such as the "Remove" button 712. The user of the user device 102*a* my select one or more of the existing connections by, for example, checking the checkbox 710 placed on the right of the profile photo, and selecting, clicking, or touching the "Remove" button 712. The client application may be configured to then respond to the user's action by sending the remove request to the user module 202. The user module 202 may be configured to respond with success (or acknowledgement) if the connection did exist. The client application may be configured to update the list based on the user module's response.

The user module 202 may also be configured to help create new bi-directional connections between a user and his or her known contacts. In some embodiments the client application of a user device (e.g., user device 102*a*) is configured to provide a user interface that displays various options for a user to create bi-directional connection to a known contact, which is further illustrated in FIG. 8.

User Invitation UI

FIG. 8 illustrates a UI for a user device (e.g., user device 102*a*) for inviting others in other social circles or those not on the system (collectively referred to as "invitees") to become users of the review system 108. In some embodiments, the user may reach this UI page by selecting a certain tab under the profile section ("My Pals" tab 804). The UI elements may comprise various graphical elements that enable a user to connect with the user's social connections existing outside the review system 108. For example, the user may be given a plurality of options to invite a known contact from other social circles such as Facebook 810, Instagram 812, Twitter 814, or may invite a connection via text (e.g., from the user's address book) 816. The user may also have an option to invite one or more people via an email invite 806. The user's connections in other social networking websites not listed above may also be used to send invitations to join the review system. Once the user selects one or more of the listed options—either by clicking or selecting certain graphical elements of the UI or by entering an email address of the invitee in the text box 806 and clicking or selecting the send button 808—the invitee may receive a notification. For example, the invitees may receive a URL along with the invitation notification. In some embodiments, the client software installed on the user device may send URLs to the invitees. The invitees may receive the invitation and a URL through their respective browsers or applications of their user devices. The invitee may accept the connection by clicking on the link, and the user module 202 may receive the request to create a new connection between the user and the user's invitee. The user module 202 may be configured to process the request and also store the mapping between the user and the user's new connection, in one or more databases. In some embodiments, the new connection (or mappings) may be stored in a user database 214. The user database 214 may comprise a mapping of each user and the user's existing mapping of connections. For example, the user identifier of each user may be associated with the other connection's user identifier as a connection.

Creating a Review UI

FIG. 9 illustrates a UI for providing a review feed to a user. The UI display of FIG. 9 may be accessible under the "Feed" view 910 page. The GUI elements may comprise a search tab (e.g., a magnifying glass 902), social connection-based filter (e.g., "Pals" filter 904, which is a toggle switch in the upper right of the user interface next to the magnifying glass 902), a review card/tab/page for a product 906, ratings/comments/likes summary section 908. The search tab may also provide various filtering capabilities and the user may be able to filter the results of the review feed based on his or her preferences. When the "Pals" filter 904 is enabled, the set of users who are connections to the logged-in user is sent to the review module 204 to filter against. Thus if the Pals filter is enabled, the user may optionally view review feeds that are in one way or another socially connected to the logged-in user (e.g., authored by the user's social connections). The UI can refresh its content automatically when a new review or newly updated review that belongs to the feed becomes available, at predetermined intervals, etc. The review system can allow the user to determine how much content is displayed initially. For example, the UI can show basic information about the product, a snapshot of a video review, the average ratings of the product, a summary of the textual reviews, and basic information about the reviewer including the social data and allow the user to drill down by further interaction with the UI.

In another instance, a search engine may be used to search against the review feeds to generate a review based on the search criteria. FIG. 10 illustrates a UI for searching reviews. The user of a user device 102*a* may click, select, or touch the magnifying glass (FIG. 9 902) to enter the user interface for searching the review feeds. The GUI elements may comprise a search box 1002, search results list 1004. The search box 1002 may allow a user to interact with the review system 108. For example, if a user types the word "Dress", the query may be sent to the review system 108, and the review module 204 may be configured to search through the product database 218, for example. The review system may then return all reviews that either contain the word "dress" or are perhaps related in some ways. The user may also submit unique identifiers as a search query. The user may also submit a location, and the review system 108 may be configured to generate and return a review feed that includes all reviews that either contain that location or are perhaps related to the location in some ways.

Figures 11, 12:
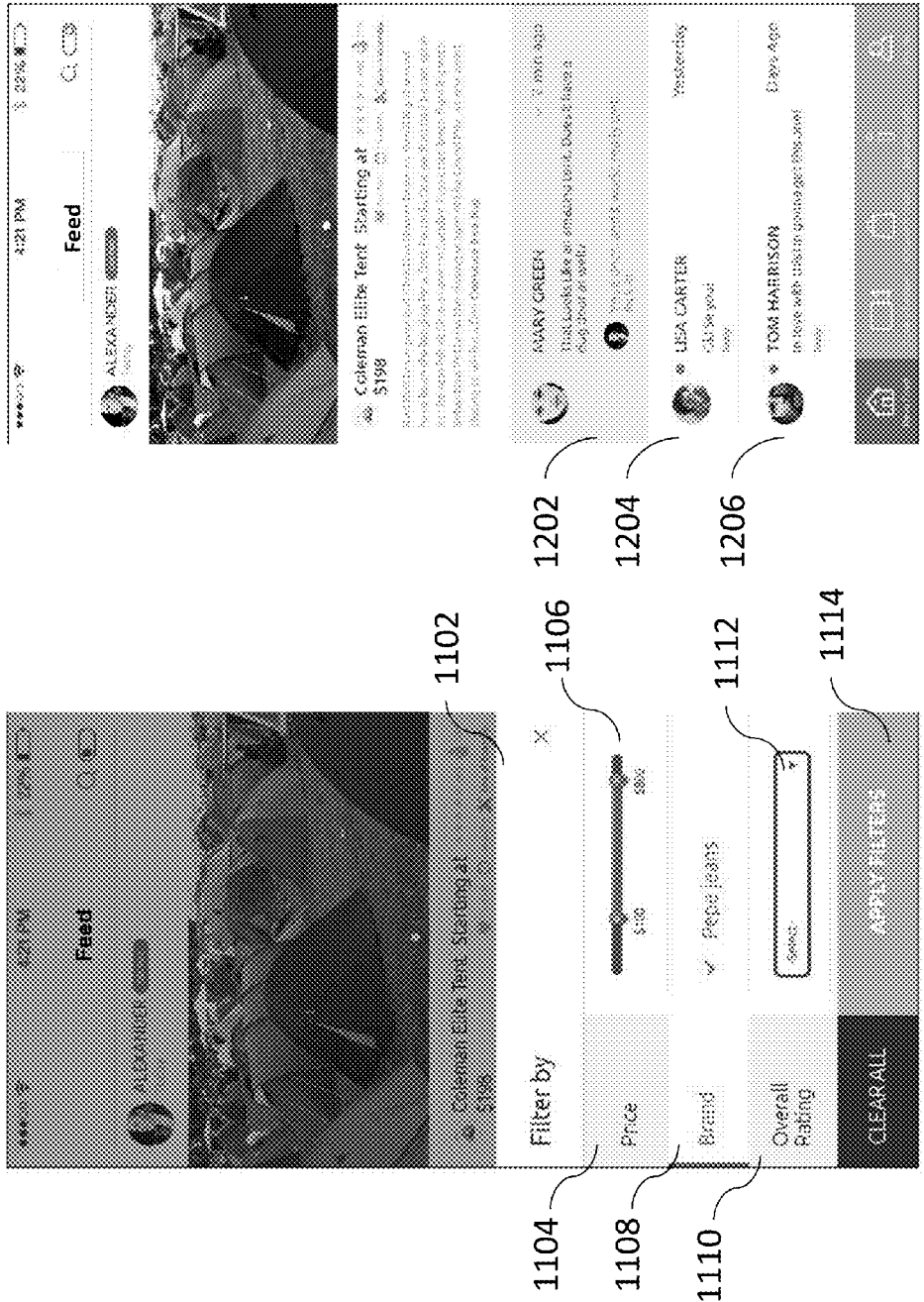
FIG. 11 illustrates a UI for filtering reviews based on one or more user-provided parameters.
FIG. 12 illustrates a UI for engaging with a review.

FIG. 11 illustrates a UI for filtering reviews based on one or more user-provided parameters. The UI elements may include a pop-up window or an overlay element 1102, and one or more parameters that a user may select to filter the review feeds by. The parameters may include price 1104, and a range of prices 1106 that a user may select, brands 1108 along with a dropdown menu of various brands, overall rating 1110 and a range of values selectable (e.g., as a dropdown menu 1112), or a range of values for a particular product category rating. If the client application installed on the user device is run in "branded", for example, a retailer filter is specified (e.g., by specifying the identifier of the retailer), which may restrict the product reviews return to the client application to only include products sold by the specified retailer. In some embodiments, once the user selects the one or more parameters listed above, the user may click or select the "Apply Filters" button 1114, to apply the chosen filters. It is to be appreciated by someone of ordinary skill in the art that the list of filtering parameters can include any attribute of a product (e.g., shipping, purchase information, or other meta data), a reviewer (e.g., social data with respect to the user, location of reviewer, or klout of the reviewer), a review (e.g., length, average ratings, or creation time, associated comments), and so on.

As described above (e.g., in FIG. 6), the review module 204 may be configured to provide search functionality for reviews. In some embodiments, the search functionality may leverage document-oriented database (i.e. document store) capabilities of text-based searching and filtering. The search functionality may include word tokenization and language based stemming. The fields that can be indexed for a product review may include the underlying product's metadata attributes such as brand, model, keywords as well as keywords associated with the categories associated with the product.

FIG. 12 illustrates a UI for engaging with a review. The client application of a user device 102*a* may render the reviews as shown in FIG. 12. The latest product reviews may be on the top most part of the page. The user may have an option to view the reviews based on the most recent posts, most viewed, most liked, most commented on, and the like, and may be customized based on the user's social connections. Latest comments or updates from a user can also be shown in a text-box below the review that pertains to it, such as 1202 (e.g., reply to a comment), 1204 (e.g., most recent comment), or 1206 (e.g., general comment from a prior time), as applicable. This UI or a similar UI can also enable the user to comment on the review in the form of text, rating, etc., like or dislike or otherwise vote for the review, delete a comment from the user's view, forward the review or a comment on the review to someone else in the user's social circle, etc.

Products Catalog UI

FIG. 13 illustrates a UI for listing product categories. For example, the client application installed on a user device may be configured to generate a GUI similar to FIG. 13. The UI of FIG. 13 may be accessible under the "Browse & Shop" page 1316. Data regarding the types of available categories may be retrieved by requesting information from the review system 108. The types of product categories displayed may be default or may be customized based on the user's preferences, purchase patterns, historical data, social connections, and various other variables related to the user. Categories may include baby & child 1304, home & garden 1306, toys 1308, electronics 1310, fashion & accessories 1312, cars & motors 1314, or any other categories that are used to categorize various available products. The user may be able to select a category to browse by selecting, clicking, or touching (on a touchscreen) one of the listed categories or an image or figure associated with a category. Then the UI may switch to product/service view, which is also exemplified in FIG. 14.

FIG. 14 illustrates a UI for displaying a list of products under a certain category. In the instant example, the user chose "Home & Garden" 1402 as a category of interest. UI elements also may include a section for subcategories 1404, and in the instant example, the user chose "outdoor" 1406 products. Below the subcategory section, product information 1408 may be displayed. Product information may include the fields of product identifier, brand, model, product description, reviews, etc. If the client application is running in "branded" model, due to the user's selections, a retailer filter may be specified (e.g., via a unique identifier of the retailer), which can restrict the products returned to only include products sold by the retailer specified.

Information related to reviews for products may also be retrieved by the client application and displayed, for example, as shown in FIG. 14. Such information may be retrieved by requesting the product module 206 for review and ratings related data for specific products. If the "Pals" filter 1302 is enabled, the set of users who are social connections to the logged-in user is sent to filter against the retrieved data. Reviews and ratings may include the overall ratings (e.g., number of stars) as well as ratings for specific attributes of the product's category. Symbols and icons can be displayed based on the attributes and/or their average values. In some embodiments, a preview view of each product 1408 may also include a preview view of icons representing the most recent reviewers and their photo excerpts 1410, which enables users to see which other users have recently reviewed the product 1408.

The client application installed on the user device 102a, interacting with the review system 108, may implement a paging functionality, wherein an initial set of products, along with their corresponding ratings, are returned (e.g., four products are displayed as the initial set of products displayed in FIG. 14). When the user scrolls up or down beyond this initial set of products, the client application can request the review system 108 for more pages.

Review Creation UI

FIG. 15 illustrates a UI for creating product reviews. The illustrated UI can provide an interactive way for a user to write a review. The illustrated UI may be accessible, for example, under the "Create a Review" page 1516. The user may be able to reach this function of the client application, for example, under a certain section on the UI (e.g., "Create a Review" section 1516). The forms and user interface components may include graphical elements for uploading images 1504 or videos 1506 for the specific product 1502 of interest, section listing various attributes 1508 which may be important to the product. Each attribute 1508 may be rated based on qualitative or quantitative measures, including various images or FIG. 1510 that may represent the user's review for the particular attribute. Other user interface components may also include graphical elements enabling editing 1512 and posting 1514 of the review form. The UI could show one or more of the images or videos 1518 already posted for this product 1502. For each of the various attributes 1508, the UI can show to a user the current average ratings of all the ratings provided for the product or of all the ratings provided by a specific group of reviewers in a user's social circle, the ratings provided by the retailer or manufacturer of the product, the ratings previously provided by the user, etc.

FIG. 16 illustrates a UI for displaying product information, including a listing of available e-commerce retailers. The UI may display product information 1602 and associated reviews 1606. The UI may also display information on e-commerce retailers 1604 from where the product may be purchased. The list of e-commerce retailers 1604 may also include the name of the retailer, the price at which the product is sold at, including the delivery charges for the particular product. The name of the e-commerce retailer may also include a direct link (e.g., URL) to the e-commerce retailer.

Notification and Aggregation UI

Figure 17:
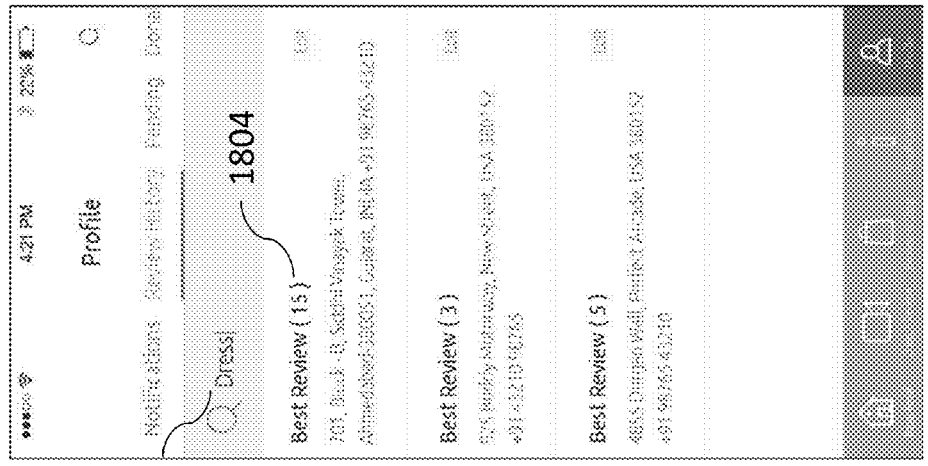
FIG. 17 illustrates a UI for notifying updates on reviews.

The client application installed on the user devices 102 may be able to request for such notifications, and may be configured to display the data retrieved in one or more forms. For example, notifications for any comments or questions for author of a review may be displayed as shown in FIG. 17. FIG. 17 illustrates a UI for notifying updates on reviews. The display UI elements may include the user's (author's) profile information 1702, search bar 1704, and a list of notifications regarding various responses or comments to the author's review 1706, 1708, and 1710. Merchants or retailers may also comment or respond to comments (1710). In another instance, the display UI may provide a notification link/button/interactive element from a user with questions regarding a certain product/service or subject area. The notification may be sent to other users who may have strong affinity to the user with questions. Those receiving the notification for solicitation of reviews may provide a review.

Figure 18:
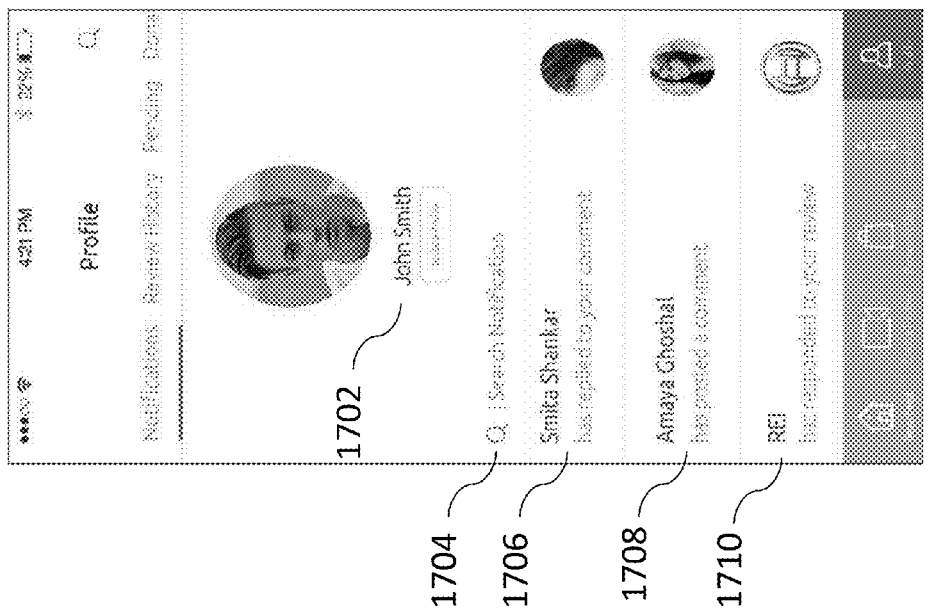
FIG. 18 illustrates a UI for notifying user engagement with reviews.

In another instance, notifications by the review system 108 may be related to the number of click throughs and votes for an author of a review. FIG. 18 illustrates a UI for notifying user engagements with reviews. The display UI elements may include a search box 1802 and a list of results based on the search 1804. For example, a user may have authored one or more reviews in the past, and may wish to understand how many times the reviews had been clicked and/or voted for. In the instant example, the user may search for "dress" 1802, and the resulting list may include three reviews that the author had drafted in the past. The list may provide to the author a summary of the number of times that the review had been voted for. As shown in FIG. 18, one of the reviews by the author may have received 15 votes 1804.

In another instance, notifications by the review system 108 may include notifications regarding reward points for click throughs to other e-commerce platforms. For example, if a user clicks on one or more products listed on his or her client application, the review system 108 may be configured, for example, to redirect the user to a purchase screen on another e-commerce system. The user may be able to earn points based on such click throughs. Other methods of earning reward points on the review system 108 may also include the number of reviews created by the user, the number of times the user has viewed other's reviews, the number of comments by the user, the number of solicitations for reviews or comments that the user has responded to, the number of comments on one's authored post that the author has responded to, the response time to any comments, and the like. Various other methods for earning reward points may be added or configured by the review system 108.

Figures 19, 20:
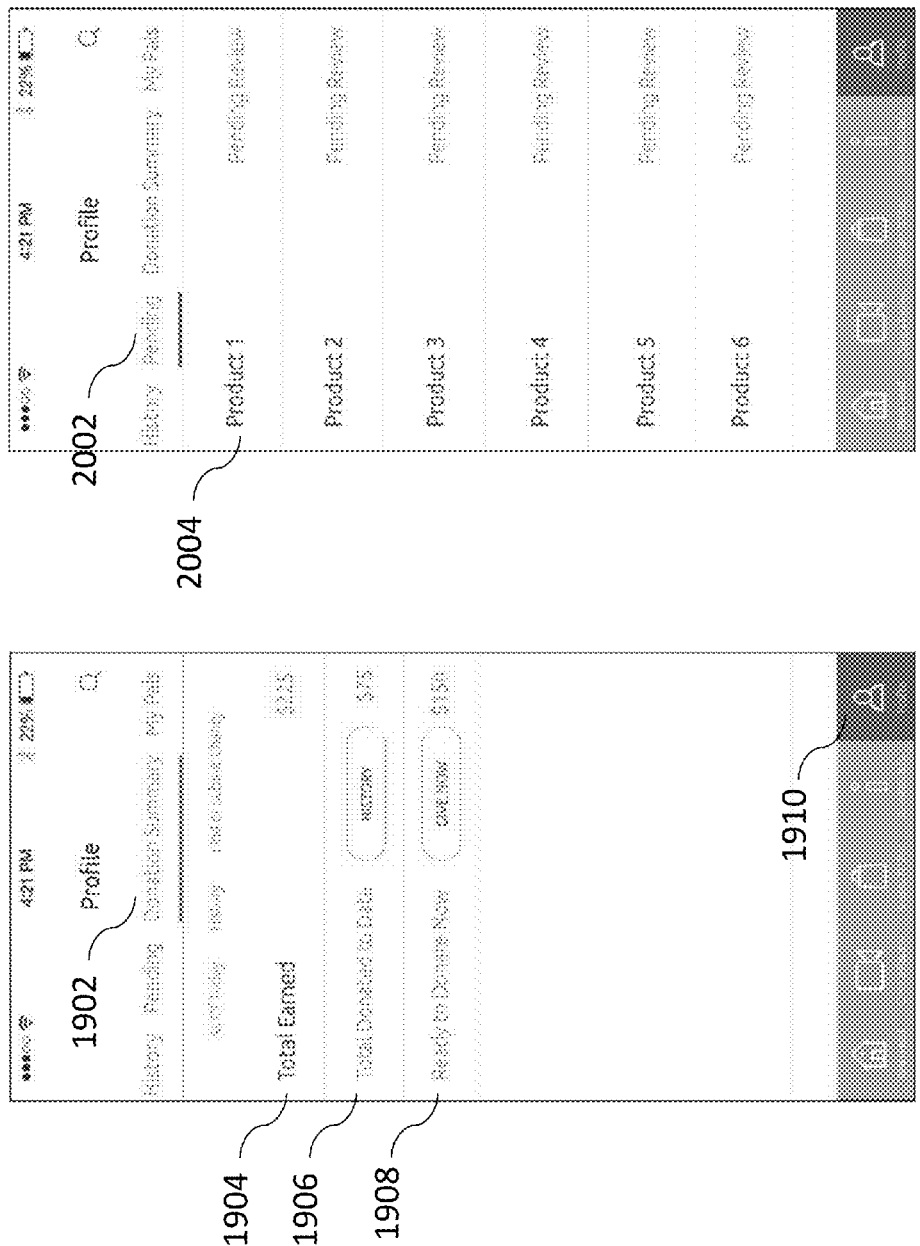
FIG. 19 illustrates a UI for notifying earned rewards.
FIG. 20 illustrates a UI for notifying pending reviews.

The client application may provide a UI for displaying such reward points on a user device 102a, as illustrated in FIG. 19. FIG. 19 illustrates a UI for notifying earned rewards. For example, the profile section of the client application 1910 may include a "donation summary" tab 1902, which can display one or more information related to the rewards. The user may also donate the earned rewards. Total earned rewards 1904, total amount of donated amount 1906 and total amount that may be donated (as of today) 1908, may also be displayed on the UI.

The client application installed on the user devices 102 may also be configured to provide notifications of pending reviews, as show in FIG. 20. Pending reviews may be based on when a viewed of a reviewer has clicked through. FIG. 20 illustrates a UI for notifying pending reviews. The user may be able to find this list under the "pending" tab 2002 of the client application. The "pending" tab may list all the products that the user may not have responded to or commented on after a click through event. For example "product 1" 2004 may be a product that requires a review from the user.

In other instances, notifications displayed by the client application may include total number of click throughs for an e-commerce platform over a certain time period aggregated by a unit of time, or for each product category over a certain time interval aggregated by a unit of time. The certain time period may be configured to be a day, month, year, or any other duration. The unit of time may be seconds, minutes, hours, days, or any other appropriate unit of time based on the type of calculation involved.

Click Through Between the Review System and External Systems

Figure 21:
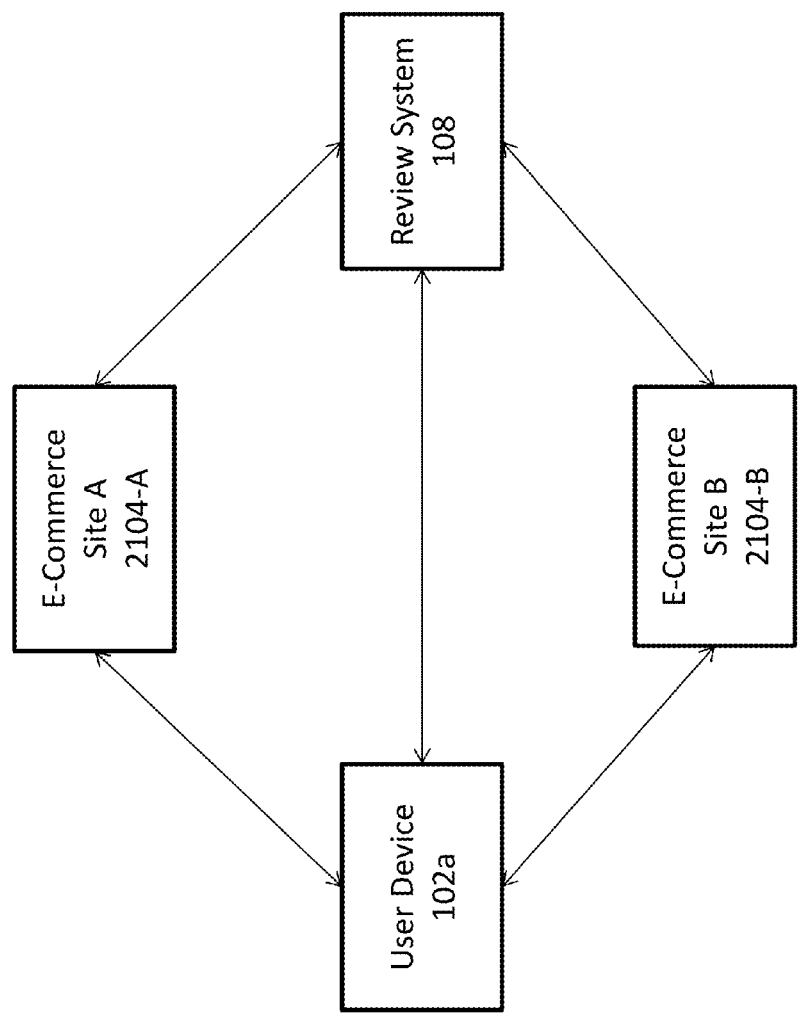
FIG. 21 illustrates a block diagram for the redirect functionality for product purchase and reviews as described herein.

The review system 108 may be configured to enable redirects from external systems (e.g., e-commerce platforms 102) to the review system 108, for the purposes of viewing and/or searching reviews for a product. The review system 108 may also be configured to enable redirects from the review system 108 to one or more external systems (e.g., e-commerce platforms 102), for the purposes of purchasing or viewing a product of interest. Such redirects may be beneficial for the review system 108 since the users may easily (with a single click or a tap) purchase a product of interest, without having to log into another website or open a separate application in order to purchase product of interest. FIG. 21 illustrates a block diagram for the redirect functionality for purchasing products and viewing reviews. For example, the review system 108 may be communicatively coupled to a user device 102a and two other e-commerce sites, e-commerce site A 2104-A and e-commerce site B 2104-B, as illustrated in FIG. 21.

In some embodiments, one or more user accounts associated with the e-commerce sites may be mapped by the review system 108, for example, via the user module 202 API described above. Referring to FIG. 21, a user of the user device 102a may have an account with the review system, and may also have accounts with external e-commerce sites, such as, for example, e-commerce site A 2104-A and site B 2104-B. The user may have requested to connect his or her existing e-commerce accounts with the review system 108, in which case the review system 108 may have stored the relevant information (e.g., user ID of the extern e-commerce sites) in its system and associated databases. Consequently, the review system 108 may be able to display any of the product reviews or catalog information (with or without the filters applied) from the e-commerce site A or B, by utilizing the stored user ID and one or more types of data or code to authenticate the user. Such product review of catalog information from those e-commerce websites may be displayed on the user device 102a, such as FIG. 14 or FIG. 16. If the user of the user device 102a clicks on a product review or a product, which may be one or more of the items represented by FIG. 14 or FIG. 16, the review system may redirect the user to one or more e-commerce websites based on the clicked or selected product or review. For example, if an outdoor tent shown in FIG. 14 is clicked on by the user, and the tent is sold on e-commerce site A 2104-A, the user may be redirected by the review system 108 to the e-commerce site A 2104-A to make a purchase of the outdoor tent. In some embodiments, once the user clicks on a certain item or review, the client application may be configured to send a POST request to the review module 204. The request may specify the click through for products/services or for reviews, and the review system 108 may respond with a redirect to the specific e-commerce site.

In another embodiment, the client application installed on the user device 102a and/or the review system 108 may be configured to retrieve location data from the user device (e.g., based on GPS sensor readings). The client application may be configured to display the location of the physical retail store (if available) affiliated with the e-commerce retailer, and also list the distance to the physical store along with other relevant information.

In other embodiments, the client application may run in "branded" mode, in which case only retailers that are filtered according to the user's selection may be available to be selected for click through to purchase. The client application may only display the retailers available to purchase under the "branded" mode, or may indicate in one way or another (e.g., by shading the items or products not available for purchase) the product's availability of purchase.

Computer Control Systems

Figure 22:
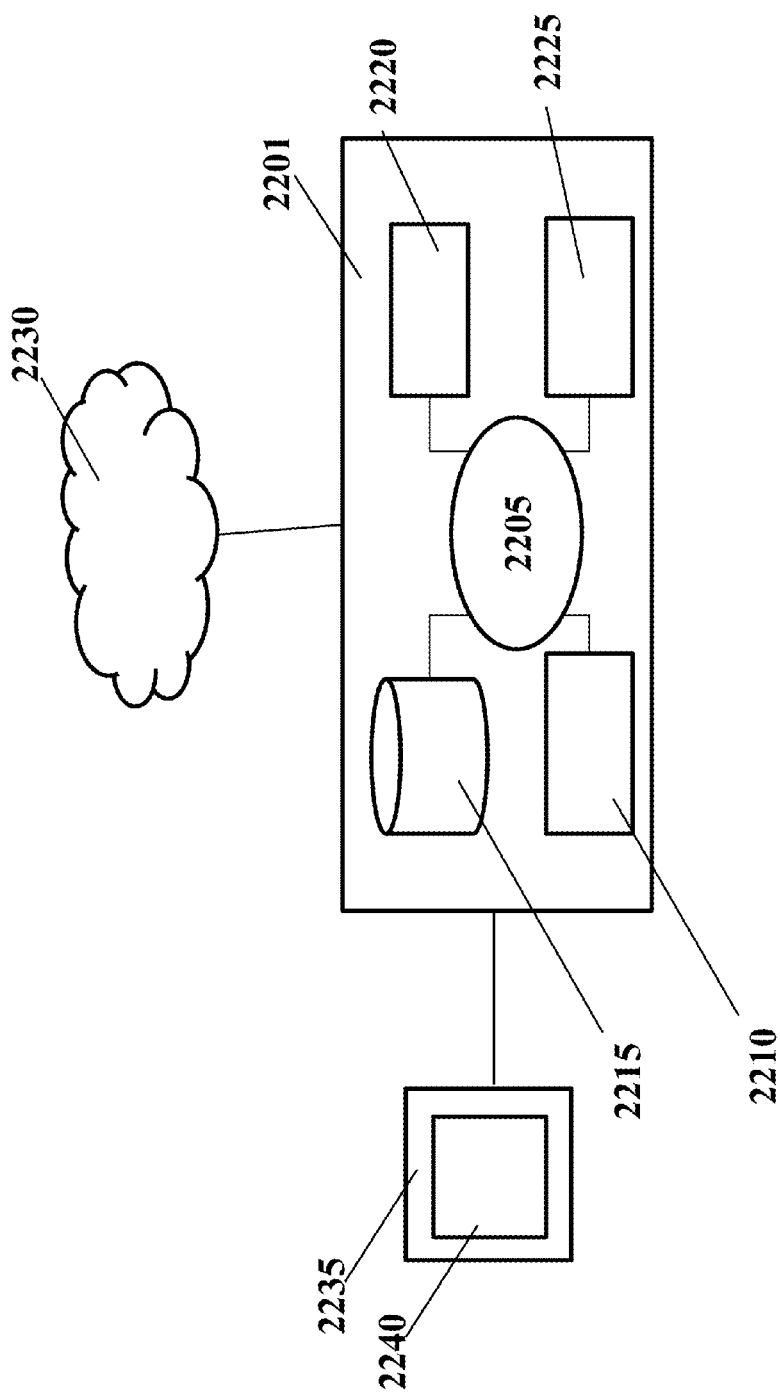
FIG. 22 illustrates example computer architecture applicable to any computer system discussed herein.

The present disclosure provides computer control systems that are programmed to implement methods of the disclosure. FIG. 22 illustrates example computer architecture applicable to any computer system discussed herein. The computer system 2201 can regulate various aspects of FIGS. 1-2, FIGS. 3-6, FIGS. 7-20, and FIG. 21 of the present disclosure, such as, for example, the review system 108 and its various components (e.g., the user module 202, the review module 204, the product module 206) and associated databases, the flow charts and methods described in FIGS. 3-6, including one or more variations thereof, and one or more aspects of the UI described in FIGS. 7-20. The computer system 2201 can be an electronic device of a user or a computer system that is remotely located with respect to the electronic device. The electronic device can be a mobile electronic device.

The computer system 2201 includes a central processing unit (CPU, also "processor" and "computer processor" herein) 2205, which can be a single core or multi core processor, or a plurality of processors for parallel processing. The computer system 2201 also includes memory or memory location 2210 (e.g., random-access memory, read-only memory, flash memory), electronic storage unit 2215 (e.g., hard disk), communication interface 2220 (e.g., network adapter) for communicating with one or more other systems, and peripheral devices 2225, such as cache, other memory, data storage and/or electronic display adapters. The memory 2210, storage unit 2215, interface 2220 and peripheral devices 2225 are in communication with the CPU 2205 through a communication bus (solid lines), such as a motherboard. The storage unit 2215 can be a data storage unit (or data repository) for storing data. The computer system 2201 can be operatively coupled to a computer network ("network") 2230 with the aid of the communication interface 2220. The network 2230 can be the Internet, an internet and/or extranet, or an intranet and/or extranet that is in communication with the Internet. The network 2230 in some cases is a telecommunication and/or data network. The network 2230 can include one or more computer servers, which can enable distributed computing, such as cloud computing. The network 2230, in some cases with the aid of the computer system 2201, can implement a peer-to-peer network, which may enable devices coupled to the computer system 2201 to behave as a client or a server.

The CPU 2205 can execute a sequence of machine-readable instructions, which can be embodied in a program or software. The instructions may be stored in a memory location, such as the memory 2210. The instructions can be directed to the CPU 2205, which can subsequently program or otherwise configure the CPU 2205 to implement methods of the present disclosure. Examples of operations performed by the CPU 2205 can include fetch, decode, execute, and writeback.

The CPU 2205 can be part of a circuit, such as an integrated circuit. One or more other components of the system 2201 can be included in the circuit. In some cases, the circuit is an application specific integrated circuit (ASIC).

The storage unit 2215 can store files, such as drivers, libraries and saved programs. The storage unit 2215 can store user data, e.g., user preferences and user programs. The computer system 2201 in some cases can include one or more additional data storage units that are external to the computer system 2201, such as located on a remote server that is in communication with the computer system 2201 through an intranet or the Internet.

The computer system 2201 can communicate with one or more remote computer systems through the network 2230. For instance, the computer system 2201 can communicate with a remote computer system of a user (e.g., user devices 102). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2201 via the network 2230.

Methods as described herein can be implemented by way of machine (e.g., computer processor) executable code stored on an electronic storage location of the computer system 2201, such as, for example, on the memory 2210 or electronic storage unit 2215. The machine executable or machine readable code can be provided in the form of software. During use, the code can be executed by the processor 2205. In some cases, the code can be retrieved from the storage unit 2215 and stored on the memory 2210 for ready access by the processor 2205. In some situations, the electronic storage unit 2215 can be precluded, and machine-executable instructions are stored on memory 2210.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 2201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2201 can include or be in communication with an electronic display 2235 that comprises a user interface (UI) 2240 for providing, for example, a list of a user's social connections, customized review feeds based on the user's social connections, product information, forms for creating video reviews, product catalogs, and other features describe herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 2205. The algorithm can, for example, execute methods described in FIGS. 3-6.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A computer-implemented method of managing reviews across computer networks based on social connections, comprising:
   identifying, by a processor, a list of features for a predetermined category to which a product or service belongs;
   receiving, by the processor, social data regarding one or more social connections of a user with a plurality of other users,
   wherein the social data indicates at least one of the list of features for which to receive information, an affinity, and a subject matter area associated with the one social connection with a specific user of the plurality of other users;

receiving, by the processor, a video review of the product or service from a device of the user in the one predetermined category,
wherein the video review was generated by the device of the user,
wherein the video review indicates one or more values provided by the user for one or more of the list of features and demonstrates the one or more features,
wherein the video review includes timing information specifying a portion of the video review corresponding to a specific one of the one or more features;
determining, by the processor, whether a device of the specific user is to have access to the video review over a communication network based on the social data,
the determining comprising computing a match score between the specific one feature and the at least one feature associated with the one social connection;
in response to a positive determination, sending, to a device of the specific user, information regarding the portion of the video review, including the timing information.

2. The computer-implemented method of claim 1, further comprising receiving a vote for or comment on the portion of the video review corresponding to the specific one feature from a device of one of the plurality of other users.

3. The computer-implemented method of claim 1, the determining further comprising
computing a similarity between a subject matter area associated with the one social connection with the specific user and the predetermined category.

4. The computer-implemented method of claim 1, wherein the determining includes assessing whether demographic information of the specific user satisfies a predetermined condition.

5. The computer-implemented method of claim 1, further comprising sending a notification of the video review or the portion of the video review to the device of the specific user over the communication network.

6. The computer-implemented method of claim 1, further comprising:
comparing the user-supplied values in the video review with merchant-supplied values corresponding to the product or service for a set of the list of features for the predetermined category; and
sending information indicating differences between the merchant-supplied values and the user-supplied values to device of the specific user over the communication network.

7. The computer-implemented method of claim 1, the one value provided by the user being a rating or a description of the one feature.

8. The computer-implemented method of claim 1, further comprising:
receiving a selection of the predetermined category from the device of the user;
causing display of the list of features by the device of the user;
the video review being received in response to the display.

9. The computer-implemented method of claim 1, the affinity data being based on an amount of time the one social connection is active or a number of responses by the user to reviews by the specific user.

10. The computer-implemented method of claim 1, further comprising transmitting, to the device of the specific user, a permission to combine the portion of the video review with other video segments to form a new video review.

11. A non-transitory computer-readable medium storing one or more instructions which, when executed by one or more processors, cause the one or more processors to perform a method of managing reviews across computer networks based on social connections, the method comprising:
identifying, by a device of a user, a list of features for a predetermined category to which a product or service belongs;
receiving social data regarding one or more social connections of the user with a plurality of other users,
wherein the social data indicates at least one of the list of features for which to receive information, an affinity, and a subject matter area associated with the one social connection with a specific user of the plurality of other users;
receiving, by the device of the user, a video review of the product or service from a device of a certain user in the one predetermined category,
wherein the video review was generated by the device of the certain user,
wherein the video review indicates one or more values provided by the certain user for one or more of the list of features and demonstrates the one or more features,
wherein the video review includes timing information specifying a portion of the video review corresponding to a specific one of the one or more features;
determining whether a device of the specific user is to receive the video review over a communication network based on the social data,
the determining comprising computing a match score between the specific one feature and the at least one feature associated with the one social connection;
in response to a positive determination, sending, to a device of the specific user, information regarding the portion of the video review, including the timing information.

12. The non-transitory computer-readable medium of claim 11, wherein the video review includes a link to an e-commerce website where the product can be purchased.

13. The non-transitory computer-readable medium of claim 11, the determining further comprising computing a similarity between a subject matter area associated with the one social connection with the specific user and the predetermined category.

14. The non-transitory computer-readable medium of claim 11, wherein the determining includes assessing whether demographic information of the specific user satisfies a predetermined condition.

15. The non-transitory computer-readable medium of claim 11, the method further comprising sending a notification of the video review or the portion of the video review to the device of the specific user over the communication network.

16. The non-transitory computer-readable medium of claim 11, the method further comprising:
comparing the user-supplied values in the video review with merchant-supplied values corresponding to the product or service for a set of the list of features for the predetermined category; and
sending information indicating differences between the merchant-supplied values and the user-supplied values to the device of the specific user over the communication network.

17. A non-transitory computer-readable medium storing one or more instructions which, when executed by one or more processors, cause the one or more processors to perform a method of managing reviews across computer networks based on social connections, the method comprising:
- identifying, by a device of a user, a list of features for a predetermined category to which a product or service belongs;
- receiving social data regarding one or more social connections of the user with a plurality of other users,
- wherein the social data indicates at least one of the list of features for which to receive information, an affinity, and a subject matter area associated with the one social connection with a specific user of the plurality of other users;
- generating, by the device of the user, a video review of the product or service in the one predetermined category,
- wherein the video review indicates one or more values provided by the user for one or more of the list of features and demonstrates the one or more features,
- wherein the video review includes timing information specifying a portion of the video review corresponding to a specific one of the one or more features;
- determining whether a device of the specific user is to receive the video review over a communication network based on the social data,
- the determining comprising computing a match score between the specific one feature and the at least one feature associated with the one social connection;
- in response to a positive determination, sending, to a device of the specific user, information regarding the portion of the video review, including the timing information.

18. The non-transitory computer-readable medium of claim 17, the method further comprising receiving a vote for or comment on the portion of the video review corresponding to the specific one feature from a device of specific user.

19. The non-transitory computer-readable medium of 17, the method further comprising:
- receiving a selection of the predetermined category;
- causing display of the list of features;
- the video review being generated in response to the display.

20. The non-transitory computer-readable medium of 17, the method further comprising transmitting, to the device of the specific user, a permission to combine the portion of the video review with other video segments to form a new video review.

* * * * *